United States Patent
Sakurai et al.

(10) Patent No.: US 7,495,819 B2
(45) Date of Patent: Feb. 24, 2009

(54) METHOD OF MANUFACTURING IMAGE DISPLAY PANEL, METHOD OF MANUFACTURING IMAGE DISPLAY DEVICE, AND IMAGE DISPLAY DEVICE

(75) Inventors: Ryou Sakurai, Kodaira (JP); Kazuyoshi Akuzawa, Kodaira (JP); Hirotaka Yamazaki, Kodaira (JP); Hiroyuki Anzai, Kodaira (JP); Hajime Kitano, Kodaira (JP); Kazuya Murata, Kodaira (JP); Gaku Yakushiji, Kodaira (JP); Norihiko Kaga, Kodaira (JP); Taichi Kobayashi, Kodaira (JP); Toshiaki Arai, Kodaira (JP); Yoshitomo Masuda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 230 days.

(21) Appl. No.: 10/539,381
(22) PCT Filed: Dec. 17, 2003
(86) PCT No.: PCT/JP03/16201
§ 371 (c)(1), (2), (4) Date: Nov. 4, 2005
(87) PCT Pub. No.: WO2004/055586
PCT Pub. Date: Jul. 1, 2004

(65) Prior Publication Data
US 2006/0231401 A1 Oct. 19, 2006

(30) Foreign Application Priority Data

| Dec. 17, 2002 | (JP) | 2002-364729 |
| Dec. 17, 2002 | (JP) | 2002-364743 |
| Dec. 20, 2002 | (JP) | 2002-370213 |
| Dec. 20, 2002 | (JP) | 2002-370220 |
| Dec. 20, 2002 | (JP) | 2002-370230 |
| Dec. 20, 2002 | (JP) | 2002-370234 |

(51) Int. Cl.
G02B 26/00 (2006.01)
G09G 3/34 (2006.01)
G03G 17/04 (2006.01)
(52) U.S. Cl. .................. 359/296; 345/107; 430/32
(58) Field of Classification Search ................. 359/296; 345/107; 430/32; 204/600
See application file for complete search history.

(56) References Cited

U.S. PATENT DOCUMENTS
3,668,106 A * 6/1972 Ota ............................ 358/305
(Continued)

FOREIGN PATENT DOCUMENTS
JP 2001-92388 A 4/2001
(Continued)

OTHER PUBLICATIONS
International Search Report.
Supplementary European Search Report dated Sep. 24, 2007.

Primary Examiner—William C Choi
(74) Attorney, Agent, or Firm—Sughrue Mion, PLLC

(57) ABSTRACT

In the case of filling and setting the liquid powders or the particles in a plurality of cells formed by the partition walls on the substrate, the method includes the steps of: setting a nozzle at an upper portion of a container; setting the substrate, on which the partition walls are arranged, at a lower portion of the container; scattering the liquid powders or the particles dispersed in a gas from the nozzle arranged at the upper portion in the container; and filling the liquid powders or the particles in the cells on the substrate arranged at the lower portion in the container. After this filling, the method further includes: a filling step for filling a predetermined amount of the liquid powders or the particles in spaces constituting the image display cells isolated by the partition walls; a removing step for removing unnecessary liquid powders or unnecessary particles remaining on the partition walls in the filling step; a substrate stacking step for stacking the transparent substrate and the opposed substrate via the partition walls and applying a sealing agent at a peripheral portion of the substrate so as to make an atmosphere between the transparent substrate and the opposed substrate uniform; and an electrode adhering step for connecting a circuit for displaying the image to the electrode so as to form a module.

15 Claims, 19 Drawing Sheets

U.S. PATENT DOCUMENTS

| | | |
|---|---|---|
| 6,175,709 B1 | 1/2001 | Takagi et al. |
| 6,836,304 B2 * | 12/2004 | Sakamaki et al. ........... 349/106 |
| 2002/0185788 A1 | 12/2002 | Otokawa et al. |

FOREIGN PATENT DOCUMENTS

| | | |
|---|---|---|
| JP | 2001-092388 A | 4/2001 |
| JP | 2002-296623 A | 10/2002 |

* cited by examiner

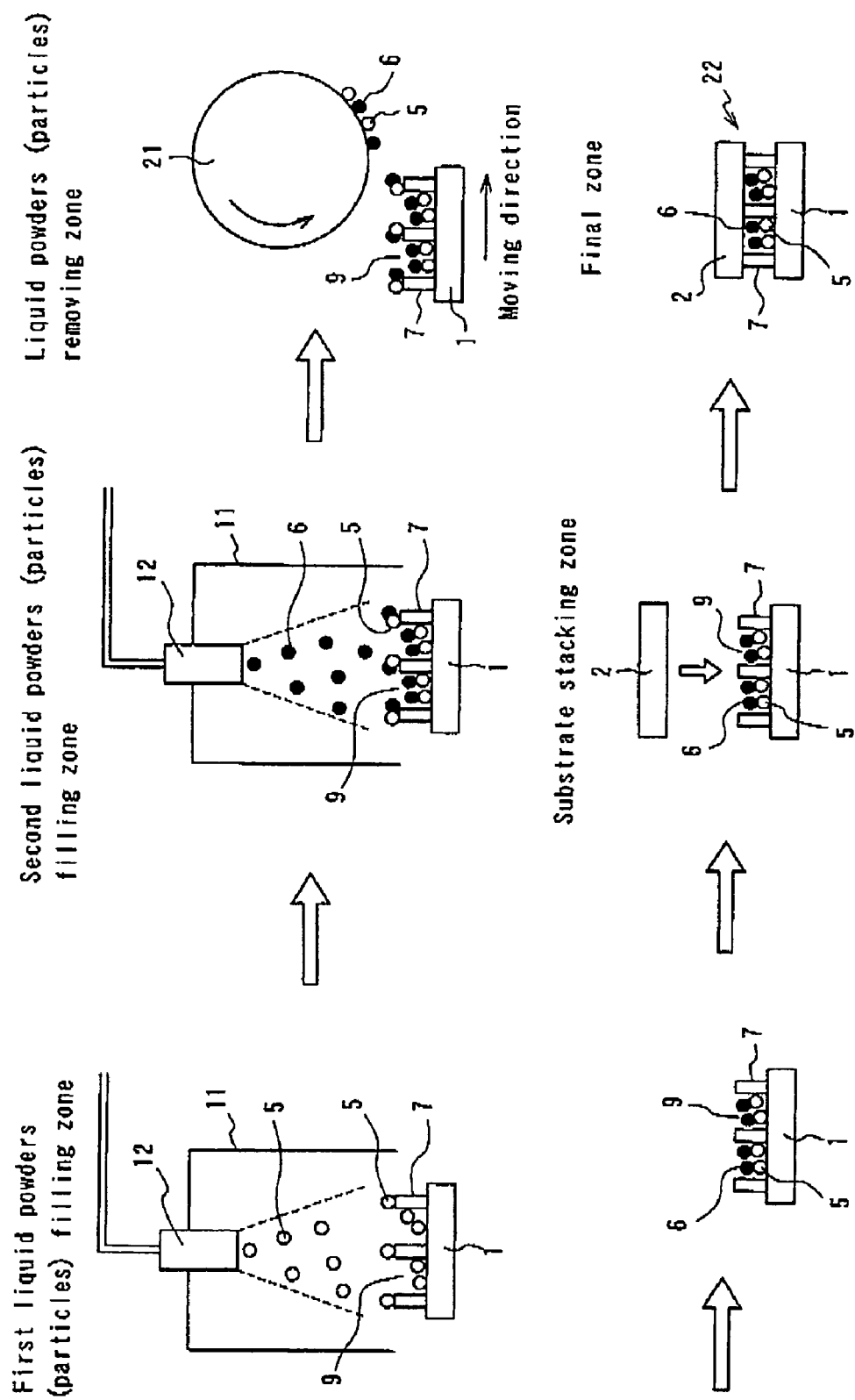

(1) Filling step (2) Removing step (3) Substrate stacking step

Transferring adhesive on rib
(UV hardening adhesive)

Applying sealing agent

Stacking by hardening sealing agent

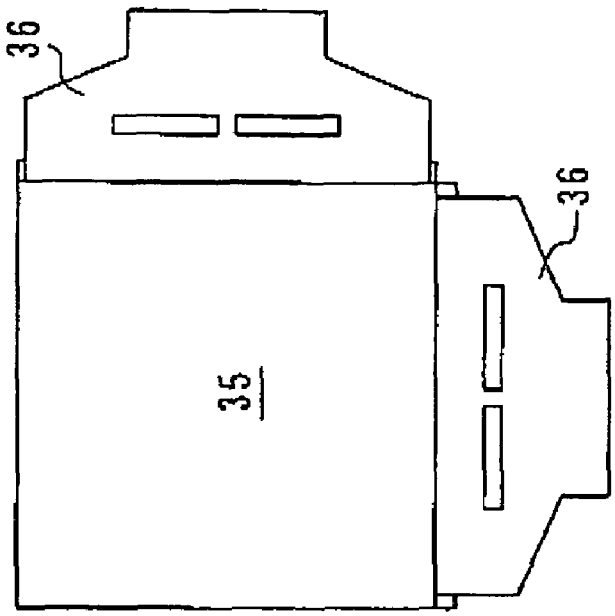
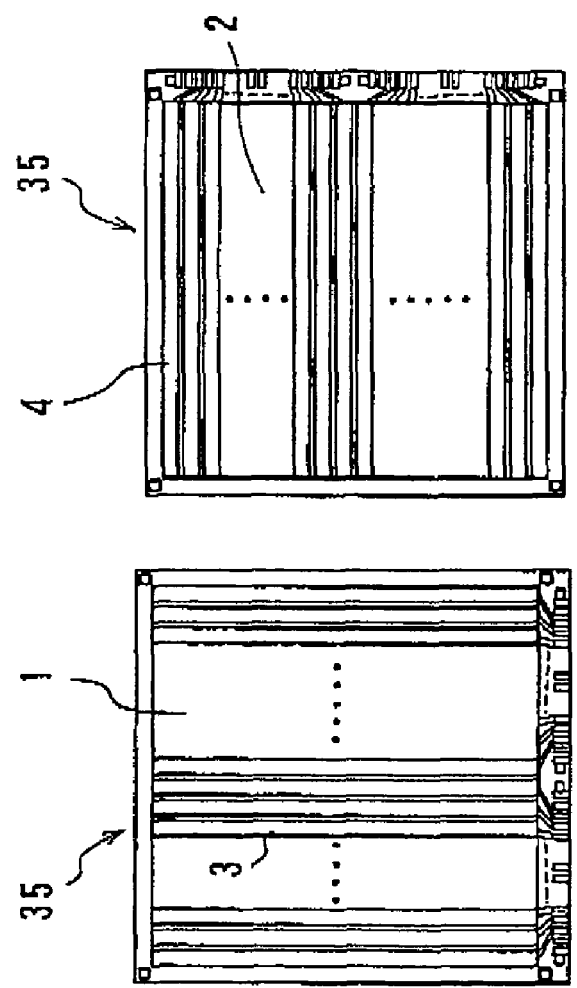
(4) or (5) electrode adhering step
FIG. 16a  FIG. 16b  FIG. 16c (4) Color filter stacking step

METHOD OF MANUFACTURING IMAGE DISPLAY PANEL, METHOD OF MANUFACTURING IMAGE DISPLAY DEVICE, AND IMAGE DISPLAY DEVICE

TECHNICAL FIELD

The present invention relates to a method of manufacturing an image display panel used for a reversible image display device enables to repeatedly display images accompanied by flight and movement of liquid powders or particles utilizing Coulomb's force and so on and an image display device. Moreover, the present invention relates to a method of manufacturing an image display device and an image display device manufactured according to the above manufacturing method, which can form a module including a circuit used for an image display.

BACKGROUND ART

As an image display device substitutable for liquid crystal display (LCD), image display devices with the use of technology such as an electrophoresis method, an electro-chromic method, a thermal method, dichroic-particles-rotary method are proposed. As for these image display device, it is conceivable as inexpensive visual display device of the next generation from a merit having wide field of vision close to normal printed matter, having smaller consumption with LCD, spreading out to a display for portable device, and an electronic paper is expected.

Recently, electrophoresis method is proposed that microencapsulate dispersion liquid made up with dispersion particles and coloration solution and dispose the liquid between faced substrates. However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252]However, the structure becomes complicated because the charge transport layer and further a charge generation layer are to be arranged. In addition, it is difficult to constantly dissipate charges from the electro-conductive particles, and thus there is a drawback on the lack of stability.

In order to solve the problems mentioned above, as an image display device having rapid response rate due to a dry type display, simple construction, inexpensive cost and excellent stability, it is known an image display device which comprises an image display panel having one or more image display cells isolated each other by partition walls, in which liquid powders composed of a solid material stably floating as a dispersoid in a gas and exhibiting a high fluidity in an aerosol state are sealed between a transparent substrate and an opposed substrate, and, in which the liquid powders, to which an electrostatic field produced by a pair of electrodes having different potentials is applied, are made to fly and move so as to display an image. Moreover, it is known an image display device utilizing normal particles in spite of the liquid powders.

However, in the dry type image display device having the construction mentioned above, a manufacturing method is not generally established, and further it is not established a technique for sealing the particles or the liquid powders equally and uniformly between the substrates, which is an especially important step in the manufacturing method. Here, if the step of sealing the particles or the liquid powders does not satisfy the above conditions, there occur various problems such as a color shading, a chipped image, a variation of image response speed due to an unevenness of distance between the substrates, an increase of driving voltage for flying and moving the particles or the liquid powders and so on.

As a method of sealing the particles (hereinafter, sometimes called as powders) between the substrates, it is conceivable that use is made of a roll coater application method in which the powders are drew out on the substrate and a particle immersion method in which the particles are applied on the substrate by floating the powders in the air by means of agitation, air blow and so on and transferring the substrate in the floating powders. Among them, in the roll coater application method, since it is difficult to adhere the particles to the substrate, it is liable to generate a shortage of filling amount (applying amount) of the particles and a deviation of density. Also, in the particle immersion method, since it is difficult to adhere the particles to the substrate, it is liable to generate a shortage of filling amount of the particles. In addition, since the particles are not firmly secured to the substrate, it is liable to generate a particle flying and a particle deviation due to a shock or a wind pressure when two substrates are stacked. Therefore, both methods are not sufficient for sealing the particles.

Moreover, in the case that a plurality of cells are formed between the substrates in a matrix arrangement by means of a grid spacer serving as the partition walls and two kinds of powders are sealed in respective cells, the particles remain on a top portion of the partition walls. Therefore, when two substrates are stacked, there is a case such that the particles remain in a boundary between the substrate and the partition wall or in a boundary between the partition walls, and thus there is a problem such that a distance between the substrates is node made even. In addition, there is no idea for a method of sealing the liquid powders between the substrates equally and uniformly.

Further, in the dry type image display device having the construction mentioned above, the partition wall arrangement is normally performed by positioning the partition walls between the transparent substrate and the opposed substrate and applying a sealing agent to an outermost peripheral portion of the substrate. In the known manufacturing method mentioned above, the connection between the substrate and the partition wall has a sufficient strength in the case that a glass substrate is used as the transparent substrate and the opposed substrate, but the connection mentioned above does not have a sufficient strength if use is made of the other transparent substrate such as a resin substrate. Furthermore, it is not known the suitable method for forming a module of circuits such as a driver used for an image display.

DISCLOSURE OF INVENTION

The present invention has for its object to eliminate the drawbacks mentioned above and to provide a method of manufacturing the image display panel, which can seal the liquid powders or the particles uniformly in a plurality of cells even when two of more kinds of the liquid powders or the particles are to be scaled. Particularly, the present invention has for its object to provide a method of manufacturing an image display panel, which can prevent liquid powders or particles remaining in the boundary, liquid powders or particles flying and a liquid powder layer or particle layer deviation when two substrates are stacked after the liquid powders or the particles are equally and uniformly arranged in a plurality of cells formed by the partition walls arranged on the substrate.

According to the invention, a method of manufacturing an image display panel used for an image display device, in which liquid powders composed of a solid material stably floating as a dispersoid in a gas and exhibiting a high fluidity in an aerosol state or particles are sealed in a plurality of cells formed by partition walls between opposed substrates, at least one substrate being transparent, and, in which the liquid powders or the particles, to which an electrostatic field is applied from two kinds of electrodes having different potentials, are made to fly and move so as to display an image, is characterized in that, in a method of manufacturing the image display panel, in which the liquid powders or the particles are sealed in the cells between the substrates by filling and setting the liquid powders or the particles on the substrate to which the partition walls are arranged and then by stacking another substrate thereon, the improvement further comprises, in the case of filling and setting the liquid powders or the particles in a plurality of cells formed by the partition walls on the substrate, the steps of: setting a nozzle at an upper portion of a container; setting the substrate, on which the partition walls are arranged, at a lower portion of the container; scattering the liquid powders or the particles dispersed in a gas from the nozzle arranged at the upper portion in the container; and filling the liquid powders or the particles in the cells on the substrate arranged at the lower portion in the container.

In the method of manufacturing the image display panel according to the invention, since the method comprises, in the case of filling and setting the liquid powders or the particles in a plurality of cells formed by the partition walls on the substrate, the steps of: setting a nozzle at an upper portion of a container; setting the substrate, on which the partition walls are arranged, at a lower portion of the container; scattering the liquid powders or the particles dispersed in a gas from the nozzle arranged at the upper portion in the container; and filling the liquid powders or the particles in the cells on the substrate arranged at the lower portion in the container, it is possible to seal the liquid powders or the particles equally and uniformly in a plurality of cells.

As one preferred embodiment of the method of manufacturing the image display panel according to the invention, in the case of filling two or more kinds of the liquid powders or the particles having different colors and different characteristics, the improvement further comprises the steps of: filling first liquid powders or first particles in the cells on the substrate by scattering the first liquid powders or the first particles dispersed in the gas from the nozzle arranged at the upper portion in the container to the substrate set at the lower portion in the container; filling continuously second liquid powders or second particles in the cells, in which the first liquid powders or the first particles are filled previously, on the substrate by scattering the second liquid powders or the second particles dispersed in the gas from the nozzle arranged at the upper portion in the container to the substrate having the cells, in which the first liquid powders or the first particles are filled, arranged at the lower portion in the container; and repeating the above filling steps so as to fill all kinds of the liquid powders or the particles in the cells. In the preferred embodiment mentioned above, it is possible to perform the filling of the liquid powders or the particles having different colors and having different charge characteristics into the cells more preferably.

Moreover, as an another preferred embodiment of the method of manufacturing the image display panel according to the invention, the scattered liquid powders or the scattered particles remaining on a top of the partition walls are removed by rolling a removing roller on the substrate, after filling and setting the liquid powders or the particles on the substrate to which the partition walls are arranged and before stacking another substrate thereon. In the preferred embodiment mentioned above, since the removing roller is rolled on the substrate, it is possible to remove the liquid powders or the particles remaining on the top of the partition walls. In addition, it is possible to solve the problems such that the liquid powders or the particles remain in a boundary between the substrate and the partition wall or in a boundary between the partition walls when the another substrate is stacked on the one substrate and then a distance between the substrates can not be made even.

As a further another preferred embodiment of the method of manufacturing the image display panel according to the invention, there are cases: such that the removing roller has conductivity and is grounded when it is rolled on the substrate; such that a circumferential length of the removing roller is longer than a length of the substrate from which the liquid powders or the particles are removed; such that JIS-A hardness of the removing roller is in a range of 40-90 degrees; and such that a construction material of the removing roller has a volume specific resistance of less than $1 \times 10^{11}$ $\Omega \cdot$cm. In each case, it is possible to perform the filling of the liquid powders or the particles into the cells preferably by optimizing the removing roller.

As a further another preferred embodiment of the method of manufacturing the image display panel according to the invention, there is a case such that the partition walls are arranged on one of or both of the substrates. Moreover, there are cases: such that the step of removing the scattered liquid powders or the scattered particles remaining on the top of the partition walls by rolling the removing roller on the substrate is performed at every times after scattering the liquid powders or the particles to be filled in the cells on the substrate; and such that the step of removing the scattered liquid powders or the scattered particles remaining on the top of the partition walls by rolling the removing roller on the substrate is performed after scattering all the liquid powders or all the particles to be filled in the cells on the substrate. Further, there is a case such that the step of scattering the liquid powders or the particles is prepared continuously by the number of the kinds of liquid powders or the kinds of particles corresponding to the kinds of liquid powders or the kinds of particles. In each case, it is possible to perform the filling of the liquid powders or the particles into the cells preferably.

As a further another preferred embodiment of the method of manufacturing the image display panel according to the invention, there are cases: such that a particle component constituting the liquid powders has an average particle diameter of 0.1-20 μm; such that a particle component constituting the liquid powders has a surface charge density of 5-150 μC/m$^2$ in an absolute value; and such that the liquid powders filled between the substrates have a volume occupying rate of 5-70 vol %. In each case, it is possible to perform the filling of the liquid powders more preferably by optimizing various properties of the liquid powders.

As a further another preferred embodiment of the method of manufacturing the image display panel according to the invention, there are cases: such that an average particle diameter of the particles is 0.1-50 μm; such that a surface charge density of the particles is 5-150 μC/m² in an absolute value; and such that the particles filled between the substrates have a volume occupying rate of 5-70 vol %. In each case, it is possible to perform the filling of the particles more preferably by optimizing various properties of the particles.

According to the invention, an image display device is characterized in that the improvement installs the image display panel manufactured according to the method of manufacturing the image display panel mentioned above.

Moreover, the present invention has for its object to eliminate the drawbacks mentioned above and to provide a method of manufacturing an image display device and an image display device manufactured according to the manufacturing method mentioned above, which can further form a module including a circuit used for an image display in a method of manufacturing an image display device having rapid response rate due to a dry type display, simple construction, inexpensive cost and excellent stability.

According to the invention, a method of manufacturing an image display device which comprises an image display panel having one or more image display cells isolated each other by partition walls, in which two kinds of liquid powders composed of a solid material stably floating as a dispersoid in a gas and exhibiting a high fluidity in an aerosol state, having a white color and a black color and having different charge characteristics, or, two kinds of particles having a white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a monotone image, is characterized in that the improvement further comprises: a filling step for filling a predetermined amount of the liquid powders or the particles in spaces constituting the image display cells isolated by the partition walls; a removing step for removing unnecessary liquid powders or unnecessary particles remaining on the partition walls in the filling step; a substrate stacking step for stacking the transparent substrate and the opposed substrate via the partition walls and applying a sealing agent at a peripheral portion of the substrate so as to make an atmosphere between the transparent substrate and the opposed substrate uniform; and an electrode adhering step for connecting a circuit for displaying the image to the electrode so as to form a module (first embodiment).

Moreover, according to the invention, a method of manufacturing an image display device which comprises an image display panel having one or more image display cells isolated each other by partition walls, in which two kinds of liquid powders composed of a solid material stably floating as a dispersoid in a gas and exhibiting a high fluidity in an aerosol state, having a predetermined color other than white color and a black color and having different charge characteristics, or, two kinds of particles having a predetermined color other than white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a color image, is characterized in that the improvement further comprises: a filling step for filling a predetermined amount of the liquid powders or the particles in spaces constituting the image display cells isolated by the partition walls; a removing step for removing unnecessary liquid powders or unnecessary particles remaining on the partition walls in the filling step; a substrate stacking step for stacking the transparent substrate and the opposed substrate via the partition walls and applying a sealing agent at a peripheral portion of the substrate so as to make an atmosphere between the transparent substrate and the opposed substrate uniform; and an electrode adhering step for connecting a circuit for displaying the image to the electrode so as to form a module (second embodiment).

Further, according to the invention, a method of manufacturing an image display device which comprises an image display panel having one or more image display cells isolated each other by partition walls, in which two kinds of liquid powders composed of a solid material stably floating as a dispersoid in a gas and exhibiting a high fluidity in an aerosol state, having a white color and a black color and having different charge characteristics, or, two kinds of particles having a white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a color image via a color filter provided to the transparent substrate constituting a front panel, is characterized in that the improvement further comprises: a filling step for filling a predetermined amount of the liquid powders or the particles in spaces constituting the image display cells isolated by the partition walls; a removing step for removing unnecessary liquid powders or unnecessary particles remaining on the partition walls in the filling step; a substrate stacking step for stacking the transparent substrate and the opposed substrate via the partition walls and applying a sealing agent at a peripheral portion of the substrate so as to make an atmosphere between the transparent substrate and the opposed substrate uniform; and an electrode adhering step for connecting a circuit for displaying the image to the electrode so as to form a module (third embodiment).

As another preferred embodiments of the method of manufacturing the image display device according to the invention (first to third embodiments), there are cases: such that an apparent volume in a maximum floating state of the liquid powders is two times or more than that in none floating state; such that a time change of the apparent volume of the liquid powders satisfies the following formula: $V_{10}/V_5>0.8$; here, $V_5$ indicates the apparent volume (cm³) of the liquid powders after 5 minutes from the maximum floating state; and $V_{10}$ indicates the apparent volume (cm³) of the liquid powders after 10 minutes from the maximum floating state; and such that an average particle diameter d(0.5) of a particle component constituting the liquid powders is 0.1-20 μm, In each case, it is possible to perform the method of manufacturing the image display device according to the invention more preferably.

Moreover, as further another preferred embodiments of the method of manufacturing the image display device according to the invention (first to third embodiments), there are cases: such that an average particle diameter of the particles is 0.1-50 μm; such that a difference between surface charge densities of the two kinds of particles measured by utilizing same carrier and in accordance with a blow-off method is 5 μC/m²-150 μC/m² in an absolute value; and such that the particles are particles in which the maximum surface potential, in the case that the surface of particles is charged by a generation of Corona discharge caused by applying a voltage of 8 KV to a Corona discharge device deployed at a distance of 1 mm from the surface, is 300 V or greater at 0.3 second after the discharge. In each case, it is possible to perform the method of manufacturing the image display device according to the invention more preferably.

Further, according to the invention, an image display device is characterized in that the improvement is manufactured according to the method of manufacturing the image display device mentioned above.

BRIEF DESCRIPTION OF DRAWINGS

FIG. 10 is a schematic view showing one embodiment wherein a filling step of liquid powders or particles is performed continuously in a method of manufacturing an image display panel according to the invention.

FIGS. 16a-16c are schematic views respectively explaining one embodiment of an electrode adhering step in a method of manufacturing an image display device according to the invention.

BEST MODE FOR CARRYING OUT THE INVENTION

Figure 1:
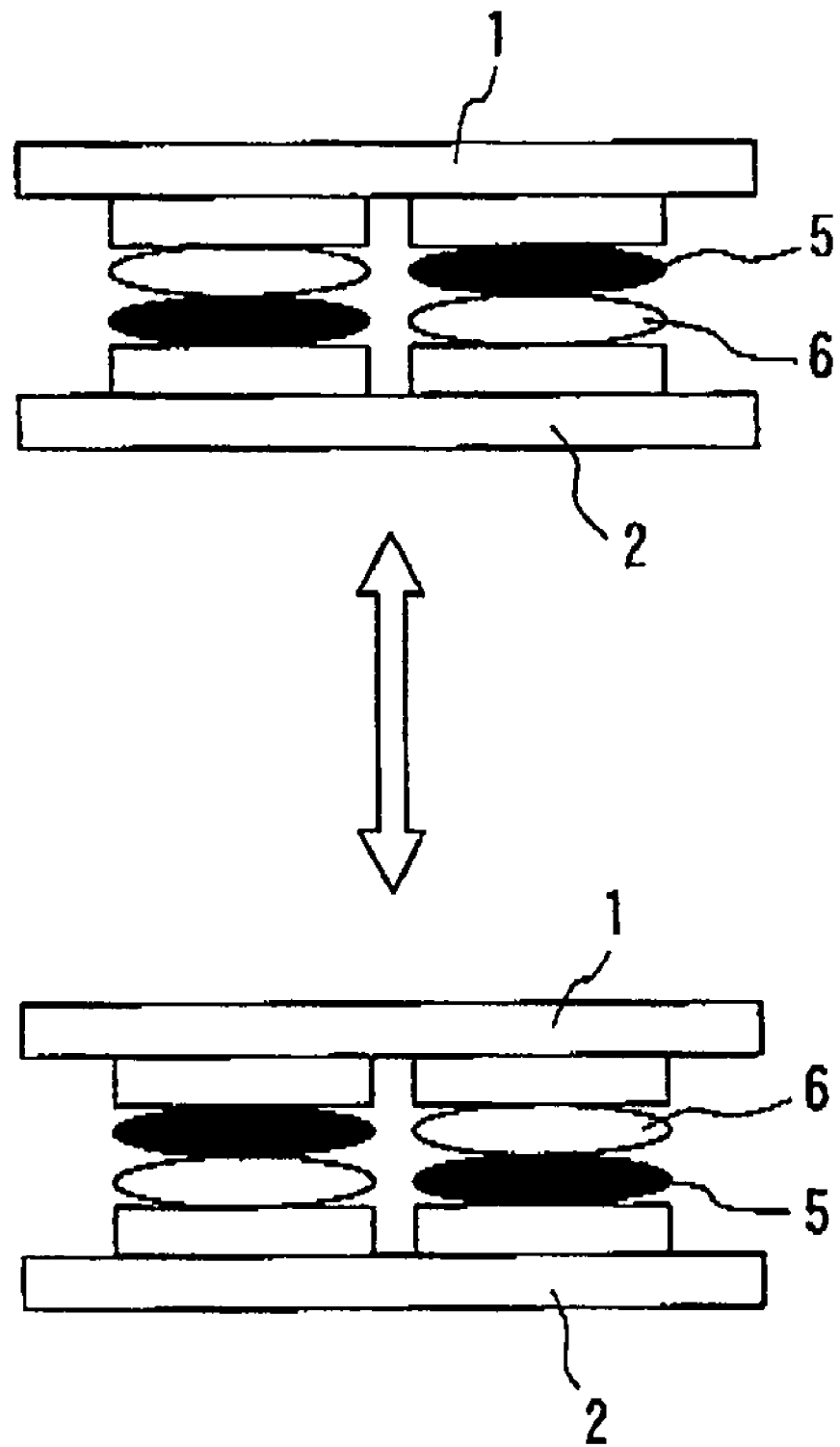
FIG. 1 is a schematic view showing one embodiment of a display method in an image display panel, which is manufactured by a method of manufacturing an image display panel according to the invention.
Figure 2:
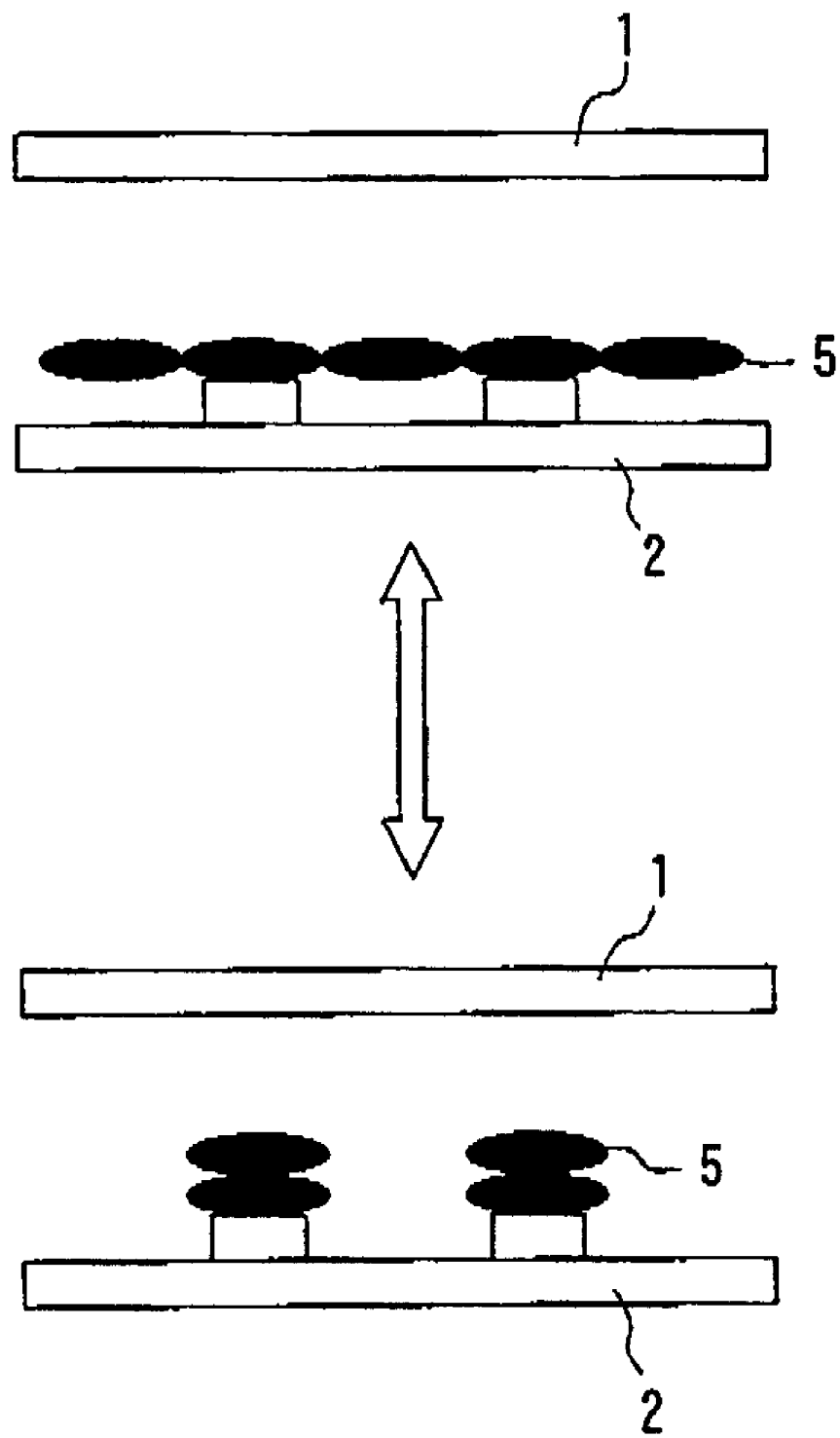
FIG. 2 is a schematic view illustrating another embodiment of a display method in an image display panel, which is manufactured by a method of manufacturing an image display panel according to the invention.
Figure 3:
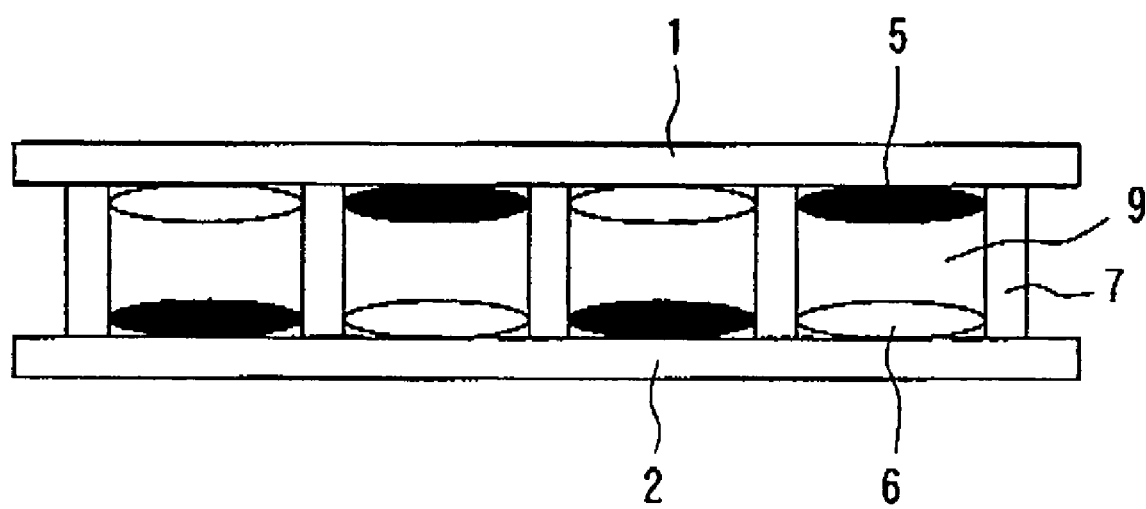
FIG. 3 is a schematic view depicting one embodiment of a panel structure in an image display panel, which is manufactured by a method of manufacturing an image display panel according to the invention.

A method of manufacturing an image display panel according to the invention can be applied to both of display methods: one method (referred to FIG. 1) wherein an image display is performed by moving liquid powders 5, 6 having different colors and two or more kinds in a vertical direction with respect to substrates 1, 2; and the other method (referred to FIG. 2) wherein an image display is performed by moving the liquid powders 5 having one color and one kind in a parallel direction with respect to the substrates 1, 2. Moreover, one embodiment of a panel structure for display is shown in FIG. 3. As shown in FIG. 3 by one example, a feature of the image display panel according to the invention is a method of filling predetermined liquid powders 5, 6 into a cell 9 formed by partition walls 4 having for example a grid shape between the substrates 1, 2. It should be noted that, in the image display panels shown in FIGS. 1-3, the same effects can be obtained even if the liquid powders 5, 6 are substituted by particles 5, 6.

Figure 4A:
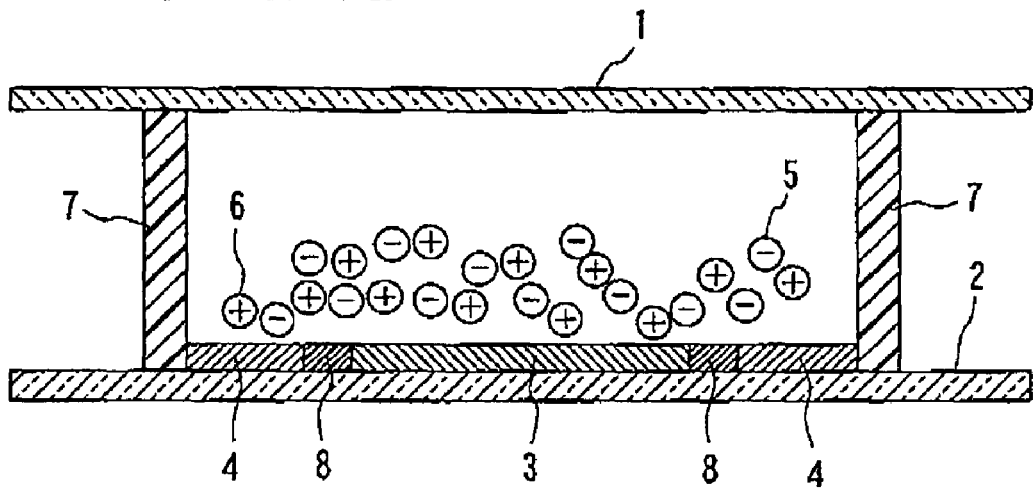
FIGS. 4a-4c are schematic views respectively showing one embodiment of a display element in an image display device, which is manufactured by a method of manufacturing an image display device according to the invention, and its display operation theory.
Figure 4B:
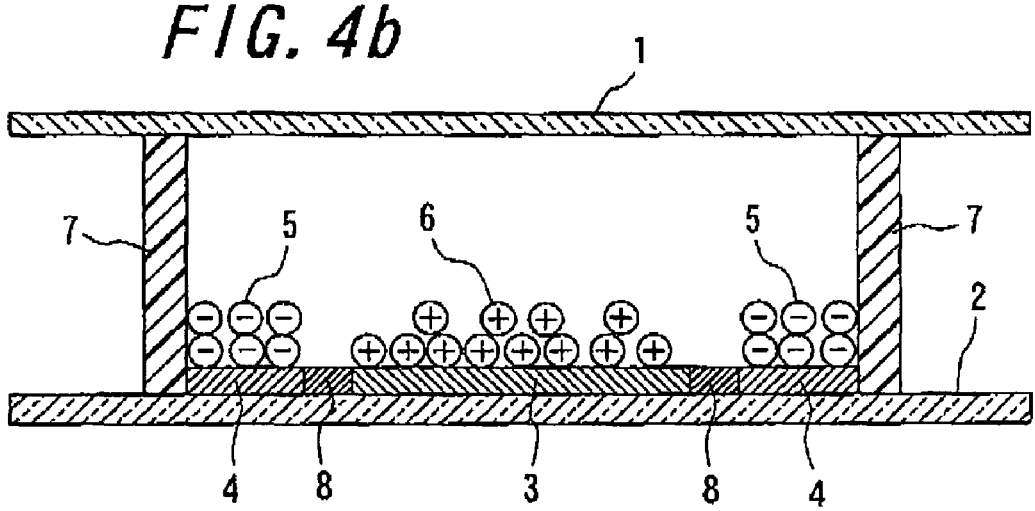
Figure 4C:
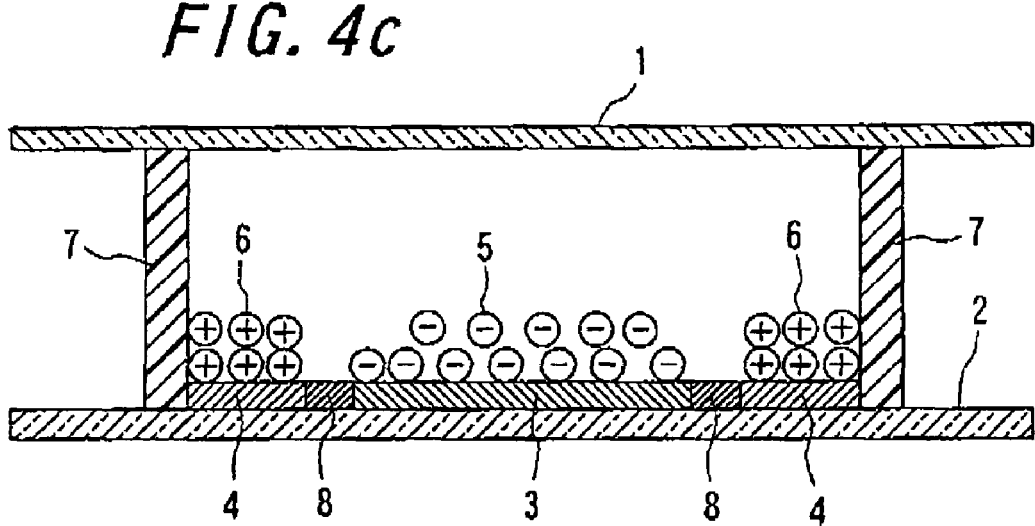

Then, a device, which is a target of a method of manufacturing an image display device according to the invention, will be explained. FIGS. 4a to 4c are schematic views respectively showing one embodiment of the image display element of the image display panel used for the image display device according to the invention and its display driving method. In the embodiments shown in FIGS. 4a to 4c, numeral 1 is a transparent substrate, numeral 2 is an opposed substrate, numeral 3 is a display electrode, numeral 4 is an opposed electrode, numeral 5 is negatively chargeable liquid powders, numeral 6 is positively chargeable liquid powders, numeral 7 is a partition wall and numeral 8 is an insulation member.

FIG. 4a shows a state such that the negatively chargeable liquid powders 5 and the positively chargeable liquid powders 6, which are composed of a solid material stably floating as a dispersoid in a gas and exhibiting a high fluidity in an aerosol state, are arranged between opposed substrates (transparent substrate 1 and opposed substrate 2). Under such a state, when a voltage is applied in such a manner that a side of the display electrode 3 becomes low potential and a side of the opposed electrode 4 becomes high potential, as shown in FIG. 4b, the positively chargeable liquid powders 6 fly and move to the side of the display electrode 3 and the negatively chargeable liquid powders 5 fly and move to the side of the opposed electrode 4 by means of Coulomb's force. In this case, a display face viewed from a side of the transparent substrate 1 looks like a color of the positively chargeable liquid powders 6. Next, when a voltage is applied in such a manner that the side of the display electrode 3 becomes high potential and the side of the opposed electrode 4 becomes low potential by reversing potentials, as shown in FIG. 4c, the negatively chargeable liquid powders 5 fly to move to the side of the display electrode 3 and the positively chargeable liquid powders 6 fly to move to the side of the opposed electrode 4 by means of Coulomb's force. In this case, the display face viewed from the side of the transparent substrate 1 looks like a color of the negatively chargeable liquid powders 5.

The display states shown in FIGS. 4b and 4c are repeatedly changeable only by reversing the potentials of a power source, and thus it is possible to change colors on the display face reversibly by reversing the potentials of the power source as mentioned above. The colors of the liquid powders can be arbitrarily selected. For example, when the negatively chargeable liquid powders 5 are white color and the positively chargeable liquid powders 6 are black color, or, when the negatively chargeable liquid powders 5 are black color and the positively chargeable liquid powders 5 are white color, a reversible image display between white color and black color can be performed. In this method, since the liquid powders are once adhered to the electrode by means of an imaging force, a display image can be maintained for a long time after a voltage apply is stopped, thereby showing an excellent memory property.

Figure 5:
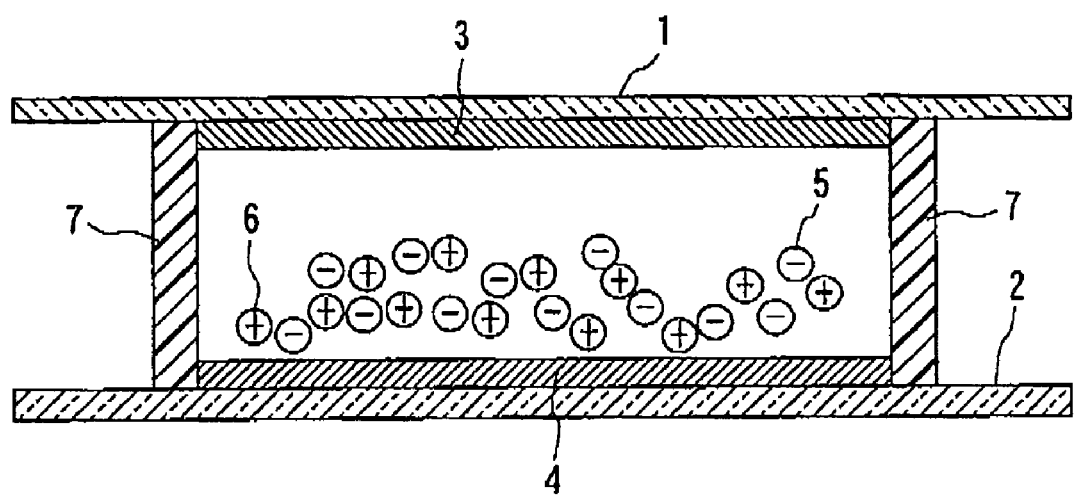
FIG. 5 is a schematic view illustrating another embodiment of a display element in an image display device, which is manufactured by a method of manufacturing an image display device according to the invention, wherein a display electrode is provided on a transparent substrate and an opposed electrode is provided on an opposed substrate.

In the embodiment shown in FIG. 4, two kinds of electrodes having different potentials i.e. the display electrode 3 and the opposed electrode 4 are provided to a side of the opposed substrate 2 opposed to the transparent substrate 1. As an another method of providing the electrodes, as shown in FIG. 5, there is a method for providing the display electrode 3 on the transparent substrate 1 and the opposed electrode 4 on the opposed substrate 2. In this case, it is necessary to use a transparent electrode as the display electrode 3. In the embodiment shown in FIG. 4, since it is possible to use an opaque electrode as both of the display electrode 3 and the opposed electrode 4, it is possible to use a metal electrode having an inexpensive cost and a low resistance such as copper, aluminum and so on. The applied outer voltage may be superimposed with a direct current or an alternate current. It is preferred to form a coat layer having an insulation property to respective electrodes so as not to leak a charge of the charged liquid powders. As the coat layer mentioned above, it is particularly preferred to use a positively chargeable resin for the negatively chargeable liquid powders and a negatively chargeable resin for the positively chargeable liquid powders, since a charge of liquid powders become difficult to leak.

The feature of the method of manufacturing the image display device according to the invention is to combine a filling step of liquid powders, a removing step of liquid powders, a substrate stacking step and an electrode adhering step when manufacturing the image display device having the construction mentioned above. It should be noted that, in the image display device shown in FIGS. 4 and 5, the same effects can be obtained even if the liquid powders 5, 6 are substituted by the particles 5, 6.

(As to the method of manufacturing the image display panel)

Hereinafter, one example of a method of filling the liquid powders, which is a feature of the method of manufacturing the image display device according to the invention, will be explained. It should be noted that the following explanation is made to the liquid powders as one example but the same filling method of the liquid powders mentioned below can be applied to the particles. Moreover, details of respective construction members will be explained later.

Figure 6:
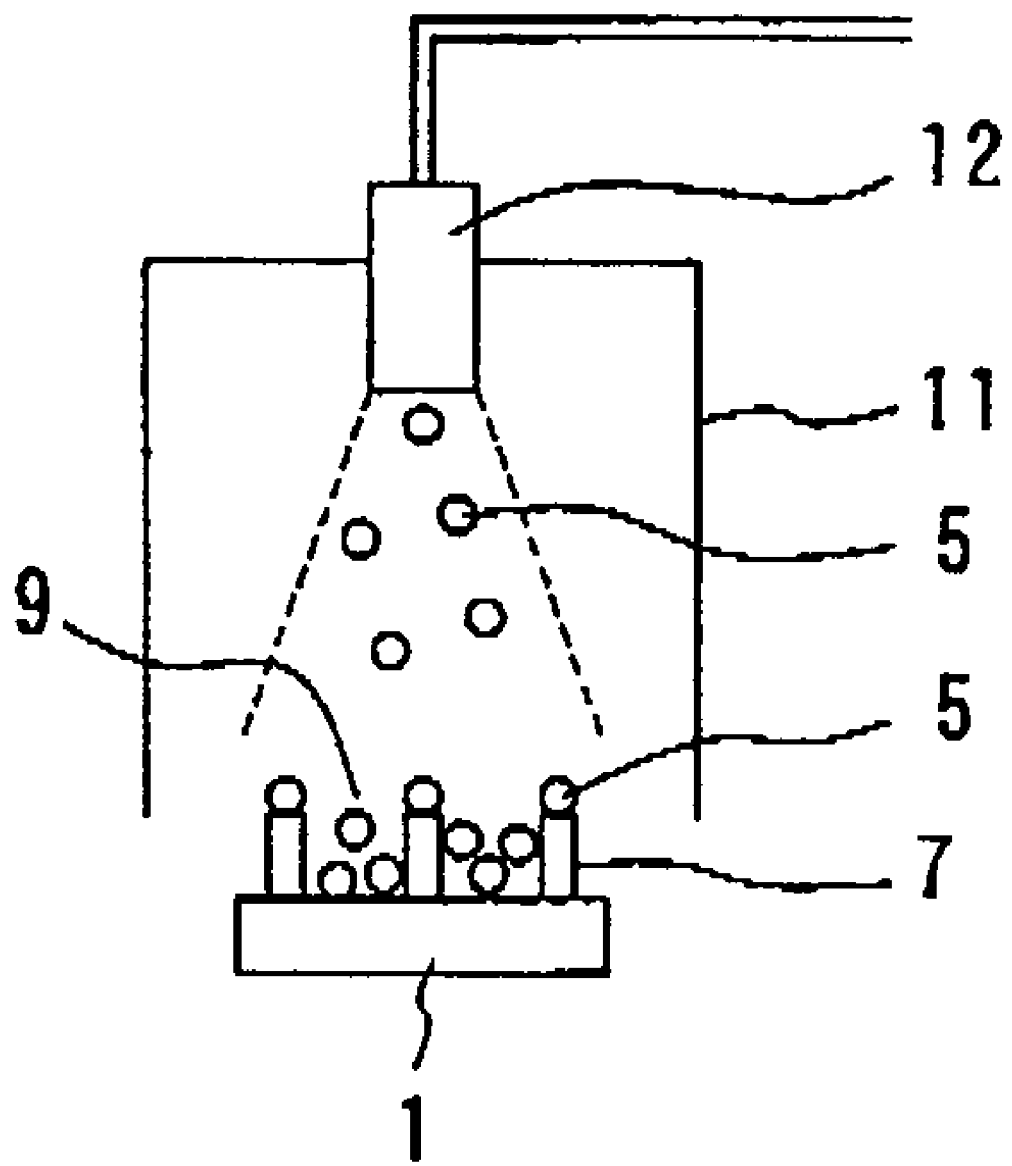
FIG. 6 is a schematic view depicting one embodiment of a method of filing liquid powders or particles in a method of manufacturing an image display panel according to the invention.

As shown in FIG. 6, a nozzle 12 is arranged to an upper portion in a container 11, and the substrate 1, on which partition walls 7 are arranged so as to form a cell 9, is arranged to a lower portion in the container 11. In this case, the substrate 1 is set in such a manner that an opening of the cell 9 is opposed to the nozzle 12. Here, the partition wall is a member, which constitutes the partition walls 7 after the image display device is accomplished, and thus they are indicated as the partition walls 7. Under such a condition, first liquid powders 5 being dispersed in a gas are scattered in the container 11 from the nozzle 12 arranged at the upper portion of the container 11, and then the first liquid powders 5 are filled in the cell 9 on the substrate 1 arranged at the lower portion in the container 11.

Figure 7:
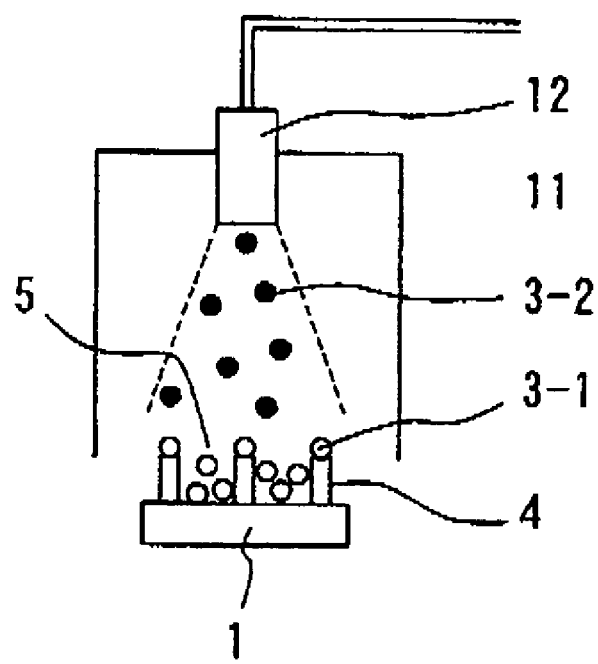
FIG. 7 is a schematic view showing another embodiment of a method of filling liquid powders or particles in a method of manufacturing an image display panel according to the invention.

Further, FIG. 7 shows a method of filling second liquid powders 6. As shown in FIG. 7, the substrate 1, in which the first liquid powders 5 are filled in the cell 9, is arranged at the lower portion in the container 11, and the second liquid powders 6 being dispersed in a gas are scattered from the nozzle 12 provided at the upper portion in the container 11, so that the second liquid powders 6 are filled in the cell 9 on the substrate 1, in which the first liquid powders 5 are preliminarily filled. If the steps mentioned above is repeated by the number of kinds of the liquid powders, the same filling step of the liquid powders 5, 6 into the cell 9 can be performed according to the invention even when the kinds of the liquid powders are three or more.

Both in the example shown in FIG. 6 and in the example shown in FIG. 7, after the steps mentioned above are finished, another kind of substrate (not shown) is adhered to the partition walls 7, so that it is possible to manufacture the image display panel according to the invention.

Figure 8:
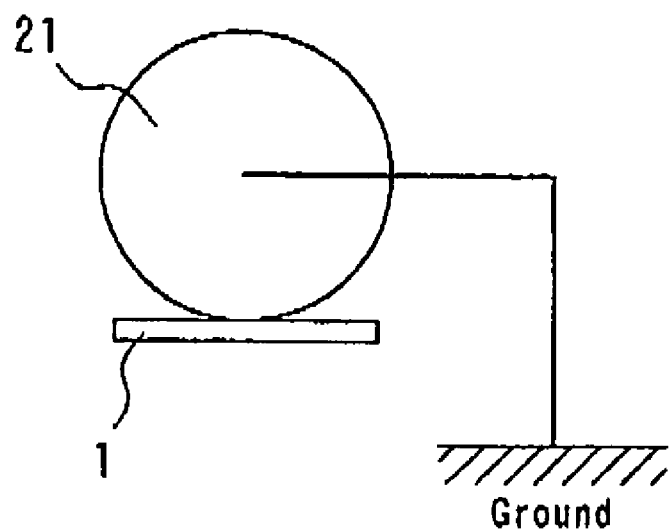
FIG. 8 is a schematic view illustrating one embodiment of a removal of liquid powders or particles by utilizing a removal roller in a method of manufacturing an image display panel according to the invention.
Figure 9A:
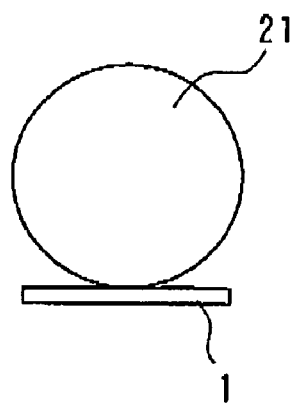
FIGS. 9a-9d are schematic views depicting another embodiment of a removal of liquid powders or particles by utilizing a removing means such as a removal roller in a method of manufacturing an image display panel according to the invention.

In the embodiment mentioned above, there is a case such that the liquid powders 5, 6 remain on a top of the partition wall 7. In such a case, it is preferred to remove the liquid powders 5, 6 from the top of the partition wall 7 by rolling a conductive removing roller 21, which is grounded, on the partition walls 7 of the substrate 1, as shown in FIG. 8 before the another substrate is stacked. In this embodiment, since the liquid powders 5, 6 remaining on the top of the partition wall 7 are moved and adhered to the removing roller 21, it is possible to remove the liquid powders 5, 6 from the top of the partition wall 7. Moreover, as mentioned above, it is preferred to use the conductive removing roller 22, which is grounded. However, in order to remove the liquid powders 5, 6, as shown in FIG. 9a, use is made of the removing roller 21, which is not grounded, and the removing roller 21 is rolled on the partition walls 7 of the substrate 1, so that it is possible to remove the liquid powders 5, 6. In this case, it is preferred that, according to need, use is further made of a charge removing blower and the liquid powders 5, 6 remaining on the top of the partition wall 7 are further removed by using the charge removing blower.

Figure 9B:
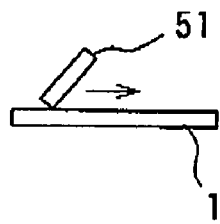
Figure 9C:
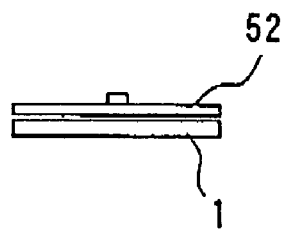
Figure 9D:
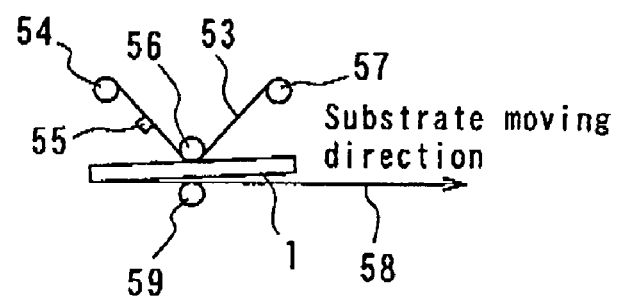

Further, in order to remove the liquid powders 5, 6, it is possible to remove the unnecessary liquid powders 5, 6 on the partition wall 7 by sliding a plate member 51 such as a blade on the substrate 1 with a friction as shown in FIG. 9b and also it is possible to remove the unnecessary liquid powders 5, 6 on the partition wall 7 by oscillating a press plate 52 with a movement in forward and backward directions, a movement in left and right directions and a rotation under such a condition that the press plate 52 is pressed to the substrate 1 as shown in FIG. 9c. Furthermore, as shown in FIG. 9d, it is possible to remove the unnecessary liquid powders 5, 6 on the partition wall 7 by pressing an adhesion sheet 53 to the substrate 1. In FIG. 9d, numeral 54 is an adhesion sheet wind-off roller, numeral 55 is a charge remover, numeral 56 is a press roller, numeral 57 is an adhesion sheet rewind roller, numeral 58 is a transfer belt and numeral 59 is a press roller or a drive roller.

FIG. 10 is a schematic view showing one embodiment wherein the first liquid powder filling step and the second liquid powder filling step mentioned above are performed continuously. In the embodiment shown in FIG. 10, a continuous line is formed by arranging a plurality of substrates 1 on a transfer belt (not shown) in such a manner that the cell 9 is faced upward. Then, in a first liquid powder filling zone, the first liquid powders 5 are filled in the cell 9 formed by the partition walls 7 on the substrate, as is the same as the embodiment shown in FIG. 6. In a second liquid powder filling zone, the second liquid powders 6 are filled in the cell 9 formed by the partition walls 7 on the substrate 1, as is the same as the embodiment shown in FIG. 7. In a liquid powder removing zone, the liquid powders 5, 6 remaining on the top of the partition wall 7 are removed, as is the same as the embodiments shown in FIGS. 8 and 9. In a substrate stacking zone, the substrate 2 is adhered to the partition walls 7 under such a condition that the liquid powders 5 and the liquid powders 6 are filled in the cell 9. In a final zone, an image display panel 22 according to the invention is obtained.

Then, the removing roller 21 will be explained.

The removing roller 21 has JIS-A hardness in a range of 40-90° and is made of a conductive material having a volume specific resistance in a range of less than $1 \times 10^{11}$ Ω·cm. In the case such that the liquid powders 5, 6 remaining on the top of the partition wall 7 are removed, it is preferred that the removing roller 21 is grounded. If JIS-A hardness of the removing roller 21 exceeds 90°, the removing roller 21 is pressed to the substrate 1 too hard, and thus the liquid powders 5, 6 remaining on the top of the partition wall 7 are cut into the top of the partition wall 7, so that a removing step, wherein the liquid powders 5, 6 are moved to the removing roller 21, is not performed preferably. If JIS-A hardness is less than 40°, a deformation of the removing roller 21 is too large, and thus the liquid powders 5, 6 filled in the cell 9 are sometimes moved to the removing roller 21, so that it is not preferred. If the volume specific resistance of the removing roller 21 exceeds $1 \times 10^{11}$ Ω·cm, the removing roller 21 becomes chargeable even when it is grounded, and thus the liquid powders 5, 6 filled in the cell 9 are sometimes moved to the removing roller 21 by means of the charged removing roller 21.

In the case of using the removing roller 21, it is preferred that the removing roller 21 is grounded. If the removing roller 21 is not grounded, the removing roller 21 itself becomes chargeable and is liable to suck fine particles. Therefore, there is a case such that the removing roller 21 removes not only the liquid powders 5, 6 remaining on the top of the partition wall 7 to be removed but also the liquid powders 5, 6 filling in the cell 9. Moreover, it is preferred that an outer circumferential length of the removing roller 21 is longer than a length of the substrate 1 wherein the liquid powders 5, 6 are remaining on the top of the partition wall. If it is not longer that the length of the substrate 1, a portion of the removing roller 21 to which the liquid powders 5, 6 are adhered is again rolling on the substrate 1 wherein the liquid powders 5, 6 are remaining on the top of the partition wall 7, the liquid powder removing step can not be performed preferably.

As a material used for the removing roller 21, use is made of a conductive material having properties mentioned above, and generally use is made of a material used for a conductive roller utilized in OA (office automation) equipments such as printer and so on preferably. As one example of such materials, there are: resins such as urethane rein, acrylate resin, polyester resin, urethane modified acrylate resin, silicone resin, nylon resin, epoxy resin, styrene resin, butyral resin, vinylidene chloride resin, melamine resin, phenol resin, fluorocarbon resin, acrylic urethane resin, acrylic urethane silicone resin, acrylic urethane fluorocarbon resin; rubbers such as urethane rubber, silicone rubber, fluorocarbon rubber, ethylene propylene rubber, butadiene rubber, styrene butadiene rubber, natural rubber, nitrite rubber; and a composite material wherein conductive agents are added to the resins or rubbers mentioned above and a volume specific resistance is controlled in a range of less than $1 \times 10^{11}$ Ω·cm.

As a measure of easily chargeable property and easily charge leak property of the removing roller 21, there is a charge-up property. In the case such that use is made of a roller having high charge-up property as the removing roller 21 used for removing the liquid powders 5, 6 remaining on the top of the partition wall 7, since a surface of the roller is easily chargeable and a charge is not easily leaked, it becomes a state such that a surface charge is easily maintained. Under such a state, if the roller is approached to the panel in which charged liquid powders are filled, there is a drawback such that a charge state is uneven because a charge of the charged liquid powders is discharged. Even if a charge is not discharged, there is a drawback such that the liquid powders in the panel are adhered to the roller because a charge of the liquid powders is attracted to the roller. In this manner, the charge state of the liquid powders becomes uneven. Therefore, there is a preferable range for the charge-up property.

In the present invention, from the viewpoint mentioned above, as disclosed in the applicant's Japanese Patent Laid-open Publication No. 2000-206777, it is preferred that: the removing roller is formed by arranging a semiconductor elastic layer around a periphery of a conductive shaft and further arranging a semiconductor elastic coating layer on its outermost periphery; and the maximum surface potential, in the case that the surface is charged by a generation of Corona discharge caused by applying a voltage of 8 KV to a Corona discharge device deployed at a distance of 1 mm from the surface, is 90 V or less at 0.35 second after the discharge. Moreover, as disclosed in the applicant's Japanese Patent Laid-open Publication No. 2000-206778, it is preferred that: the removing roller is formed by arranging a semiconductor elastic layer around a periphery of a conductive shaft; and the surface potential attenuation rate, in the case that the surface is charged by a generation of Corona discharge caused by applying a voltage of 8 KV to a Corona discharge device deployed at a distance of 1 mm from the surface, is 0.1 (V/sec) or greater in a absolute value at 0.1-0.2 second after the charge applying operation.

Figure 11:
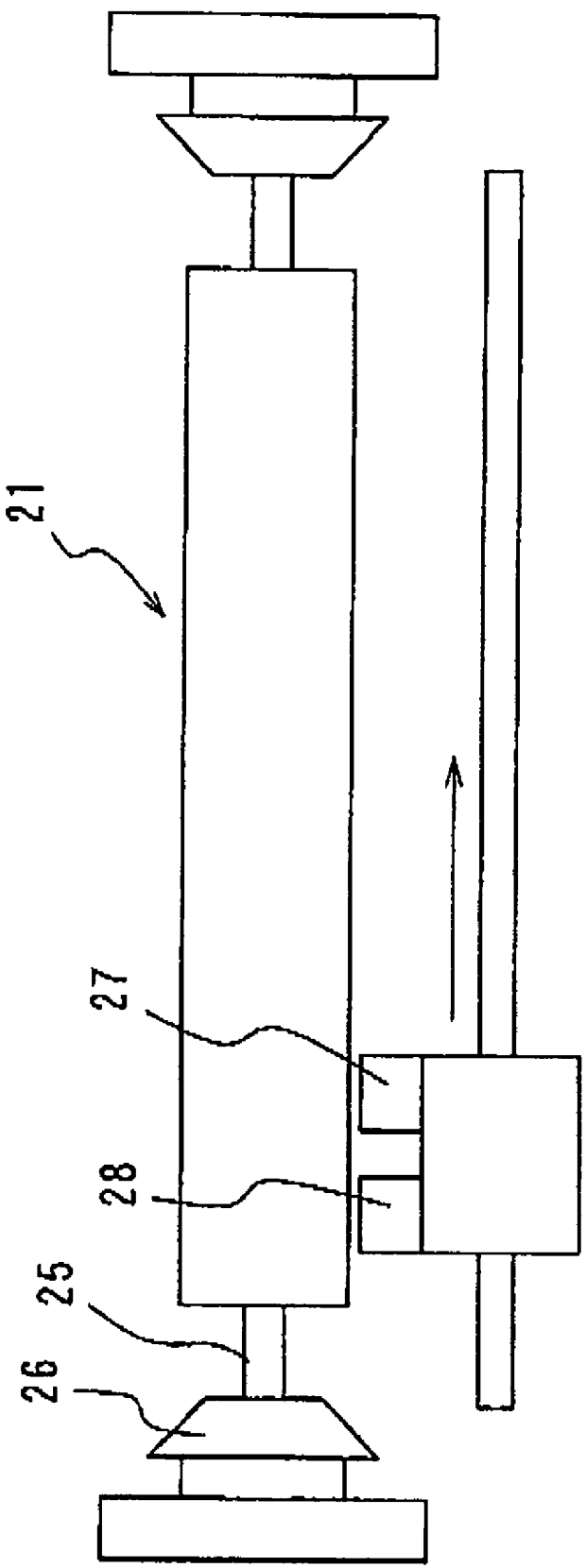
FIG. 11 is a schematic view illustrating one embodiment of an apparatus for measuring a surface potential of a removal roller utilizing in a method of manufacturing an image display panel according to the invention.

Additionally, the charge applying operation to the removing roller 21 and the surface potential measurement are performed by means of an instrument for example as shown in FIG. 11. That is, both end portions of a roll shaft 25 of the removing roller 21 are held with chuck 26, and a compact scorotron discharger 27 and a surface potential meter 28 are spaced with predetermined interval to form a measurement unit. The measurement unit is facedly deployed with a distance of 1 mm from the surface of the removing roller 21, and by moving the measurement unit 27, 28 from one end portion of the removing roller 21 to the other end portion with an uniform speed, with the state that the removing roller 21 remains stopping and while giving surface charge, a method of measuring its surface potential is preferably adopted.

As to the First Embodiment of the Method of Manufacturing the Image Display Device Hereinafter, respective steps, which are features of the first embodiment of the method of manufacturing the image display device according to the invention, will be explained. It should be noted that the explanation is made to the liquid powders as one example in the explanation mentioned below, but it is possible to utilize the same filling steps for the liquid powders as it is with respect to the method of filling the particles if the liquid powders are exchanged to the particles.

The features on the first embodiment of the method of manufacturing the image display device according to the invention are to combine a liquid powder filling step, a liquid powder removing step, a substrate stacking step and an electrode adhering step, when manufacturing the image display device having the construction mentioned above. It should be noted that, in the embodiments mentioned below, the explanation is made to a monotone display of PDA (Personal Digital Assistant) as one example of the image display device wherein an electrode width corresponding to one pixel is 300 μm, an electrode interval is 50 μm, an interval between the transparent substrate 1 and the opposed substrate 2 is 50 μm and an opening rate is 75%. Moreover, details of respective construction members will be explained later.

Figure 13:
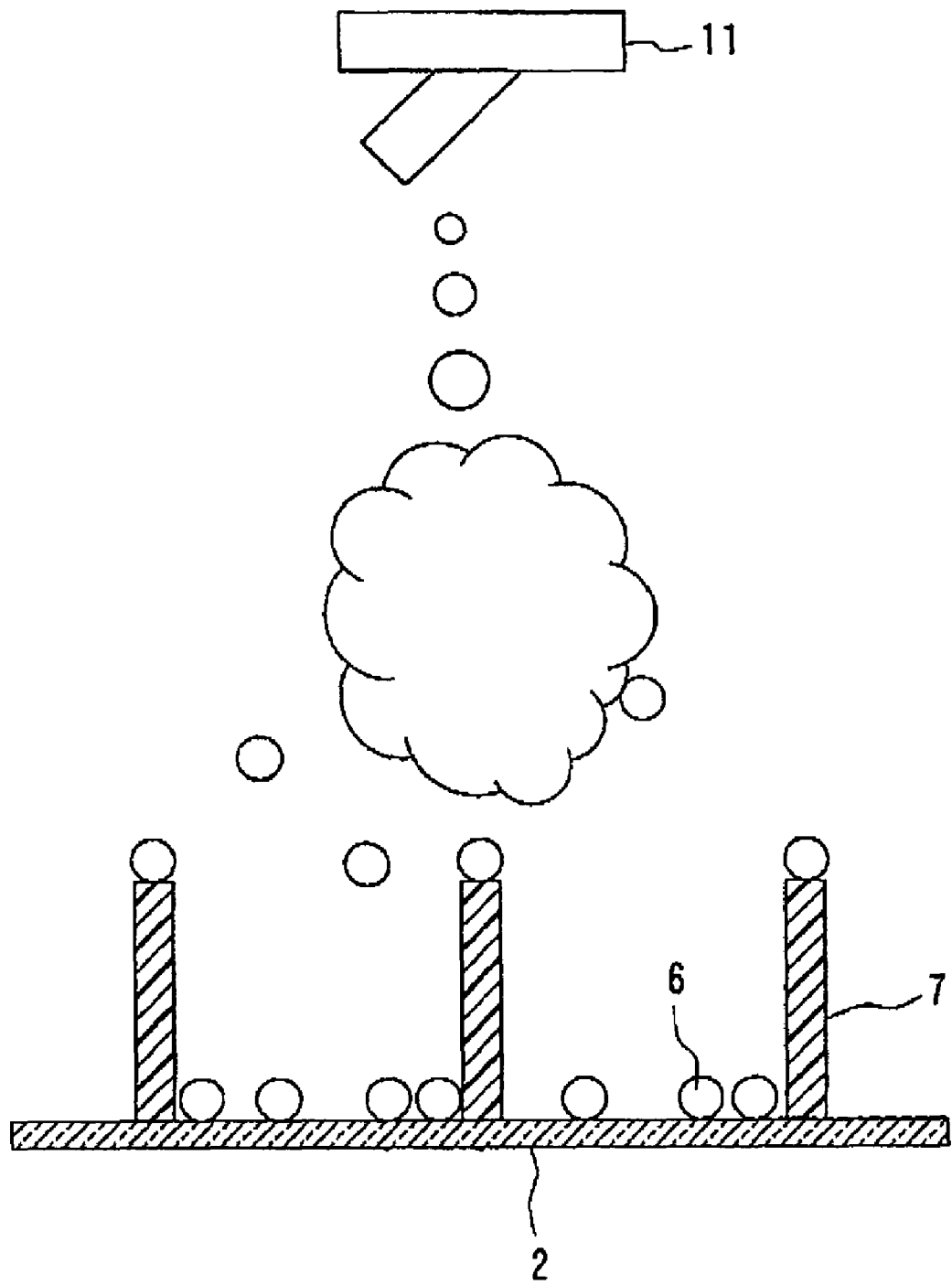
FIG. 13 is a schematic view explaining one embodiment of a filling step in a method of manufacturing an image display device according to the invention.

(1) As to the filling step of the liquid powders:

FIG. 13 is a schematic view explaining one embodiment of the filling step of the liquid powders. In the embodiment shown in FIG. 13, a predetermined amount of black liquid powders 5 and a predetermined amount of white liquid powders 6 are orderly filled from a filling apparatus 11 in a space constituting the image display element formed by the partition walls 7 arranged on the opposed substrate 2. As the method of filling the liquid powders, use is made of a method for scattering the liquid powders 5, 6 to the opposed substrate 2 by utilizing gravity or air flow or a method for flying the liquid powders 5, 6 by utilizing an electrostatic charge. At that time, if necessary, the liquid powders 5, 6 are forcedly charged so as to be a mono-disperse state and are scattered for the purpose of evenly scattering by eliminating an agglutination of the liquid powders. Moreover, there is a case such that an electric field is applied to the opposed substrate 2 for the purpose of effectively scattering the liquid powders 5, 6 to the opposed substrate 2.

In the present invention, when two or more kinds of different colors and different charge characteristics are filled in a predetermined position, a separately filling is preferably performed. However, according to a combination of the utilized two or more kinds of liquid powders or particles, it is possible to fill the liquid powders or the particles after preliminarily mixing them. In this case, since the filling step is finished only by one step, there is a merit such that the filling step is shortened. However, when use is made of two or more kinds of liquid powders or particles having different colors and different charge characteristics as mentioned above, the mixture is liable to be uneven, and thus it is necessary to use an even mixture as far as possible.

Figure 14A:
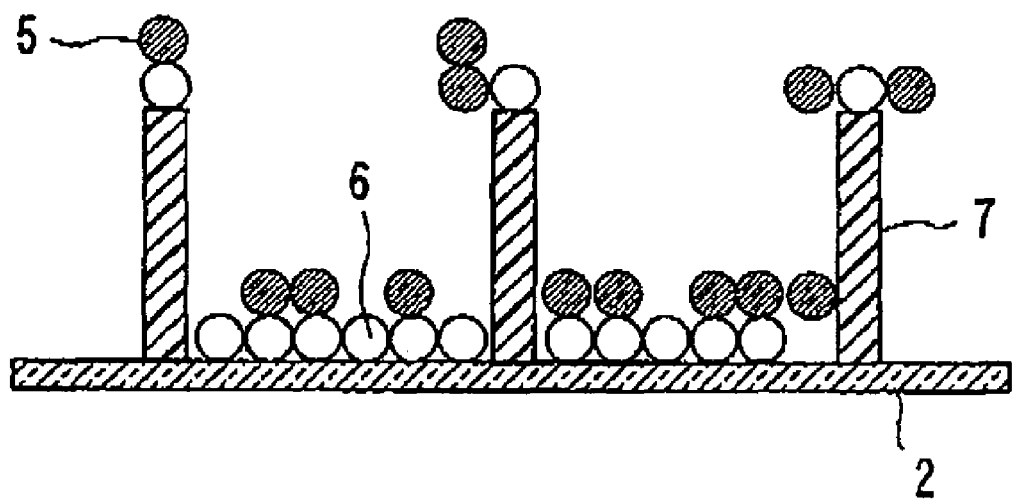
FIGS. 14a and 14b are schematic views respectively explaining one embodiment of a removing step in a method of manufacturing an image display device according to the invention.
Figure 14B:
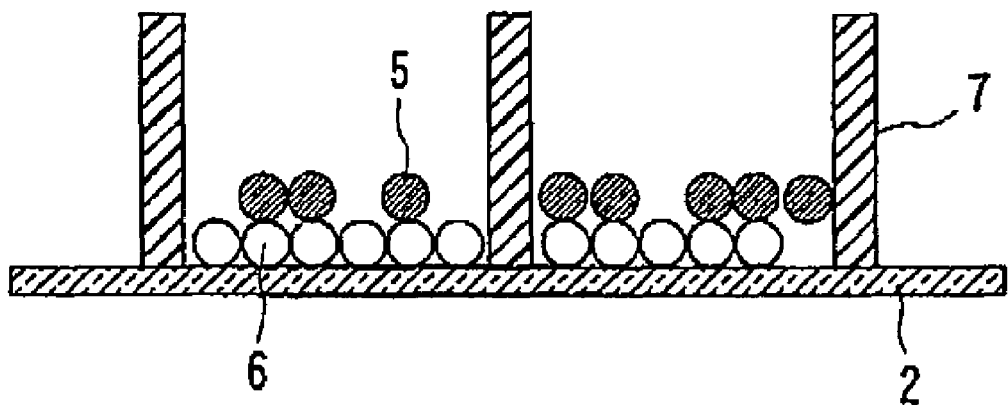

(2) As to the removing step of the unnecessary liquid powders:

FIGS. 14*a* and 14*b* are schematic views respectively explaining one embodiment of the removing step of the liquid powders. After the filling step of the liquid powders is finished, in the case such that the transparent substrate 1 and the opposed substrate 2 are stacked, as shown in FIG. 14*b*, it is necessary to remove the unnecessary liquid powders 5, 6 remaining on the partition wall 7 as shown in FIG. 14*a*. If the unnecessary liquid powders 5, 6 remain, a distance between the electrode 3 and the electrode 4 is made to be uneven when the substrates are stacked. Therefore, a driving voltage becomes different from a design value, and thus it is not possible to achieve desired display characteristics. As a method of removing the unnecessary liquid powders 5, 6 remaining on the partition wall 7, use is made of a method for removing them by utilizing an adhesive roll, a method for removing the unnecessary liquid powders by blowing them away by means of an air flow. As the another method, as shown in FIGS. 9*b*, 9*c* and 9*d*, it is possible to remove the unnecessary liquid powders 5, 6 on the partition wall 7 by sliding a plate member such as a blade on the substrate 1 with a friction, or, it is possible to remove the unnecessary liquid powders 5, 6 on the partition wall 7 by pressing a sheet-like member or a film-like member to the substrate 1. Moreover, if use is made of a step wherein the liquid powders 5, 6 are not adhered to the partition wall 7 selectively, it is not necessary to perform the removing step of the liquid powders 5, 6 on the partition wall 7.

Figure 15A:
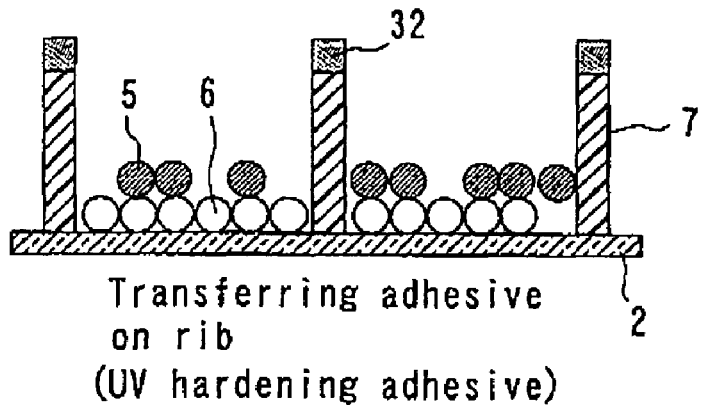
FIGS. 15a-15c are schematic views respectively explaining one embodiment of a substrate stacking step in a method of manufacturing an image display device according to the invention.
Figure 15B:
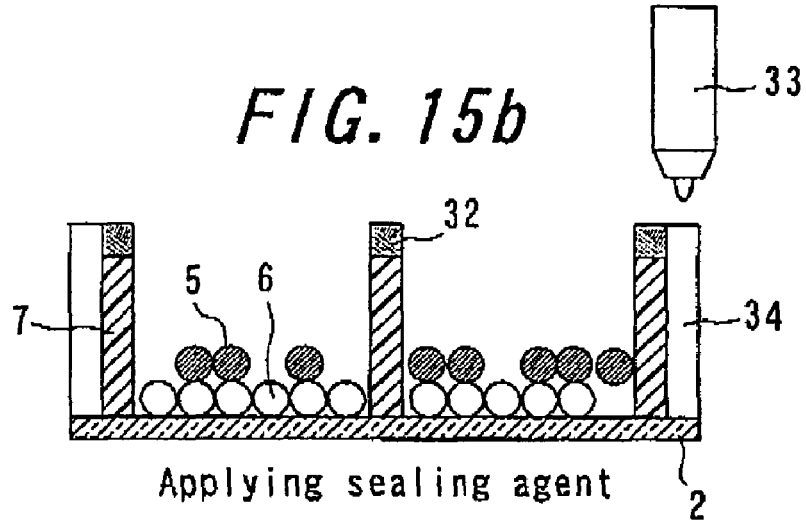
Figure 15C:
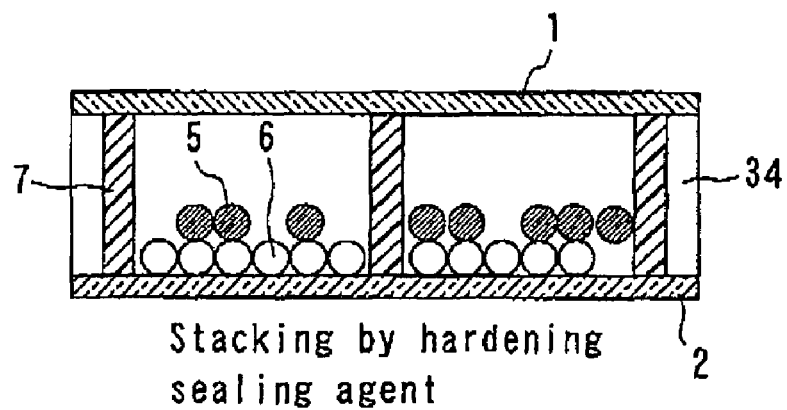

(3) As to the substrate stacking step:

FIGS. 15*a*-15*c* are schematic views respectively explaining one embodiment of the substrate stacking step. In this embodiment, a positioning alignment is performed by utilizing the opposed substrate 2 and the transparent substrate 1 to which a mark for positioning is preliminarily arranged. In this case, for the purpose of improving durability and reliability as the display, an adhesive 32 is arranged on a tip portion of the partition wall 7 as shown in FIG. 15*a*, and a connection between the partition wall 7 and the transparent substrate 1 is performed through the adhesive 32. As a method of arranging the adhesive 32, use is made of a method for screen-printing a thermosetting or UV hardening adhesive, a method for arranging an adhesive layer for sealing on an overall surface of the transparent substrate 1, or, a method for scattering the liquid powders having adhesion properties and sealing by heat and pressure.

Further, for the purpose of preventing an inclusion of component, which affects the display, such as external moisture content, a scaling agent is applied around an outermost peripheral portion of the substrate so as to seal a space between the substrates. As a method of applying the sealing agent, use is made of a method wherein a sealing agent 34 is applied to the outermost peripheral portion by means of a sealing agent applying device 33 as shown in FIG. 15*b* after the adhesive 12 is arranged on a tip portion of the partition wall 7 as mentioned above, and then as shown in FIG. 15*c*, the transparent substrate 1 and the opposed substrate 2 are positioned by utilizing an position aligning device not shown and are stacked. It should be noted that, if use is made of a transparent substrate with a color filter as the transparent substrate 1 mentioned above, it is possible to obtain an image display panel for a color display utilizing the color filter.

(4) As to the electrode adhering step:

FIGS. 16*a*-16*c* are schematic views respectively explaining one embodiment of the electrode adhering step. In this embodiment, for the purpose of transmitting a signal for image display to an image display panel 35 so as to obtain an image display device wherein the image display panel 35 (display) is formed as a module, the electrodes 3, 4 of the image display plate 35 and a driving circuit 36 are connected. At first, as shown in FIG. 16*a*, a stripe electrode with the rib is formed on an outer surface of the transparent substrate 1 being a front plane as the display electrode 3. Then, as shown in FIG. 16b, a stripe electrode with the rib is formed on an outer surface of the opposed substrate 2 being a rear plane as the opposed electrode 4. After that, as shown in FIG. 16c, the electrodes 3, 4 of the image display panel 35 and the external driving circuit 36 formed by ACF (Anisotropic Conductive Film) are connected, and then the image display device formed as a module is obtained.

As a method of connecting the electrodes, use is made of a method for directly installing IC on the substrate by utilizing an adhesive, a method of installing a flexible printed board by utilizing an adhesive and so on. As the adhesive, use is made of an anisotropic conductive paste, and an adhesive in which the conductive particles are not scattered, except for an anisotropic conductive film made of an adhesive having an anisotropic property in which the conductive particles are scattered therein as mentioned above.

Figure 17:
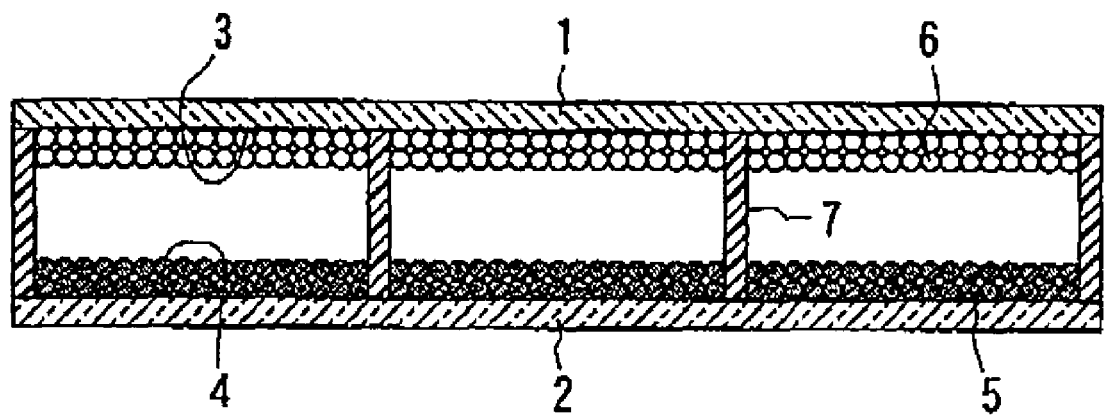
FIG. 17 is a schematic view showing one structure of a mono-chrome image display panel according to a first embodiment in a method of manufacturing an image display device according to the invention.

According to the steps mentioned above, the image display panel 35 is formed as a module and the image display device is manufactured. FIG. 17 is a schematic view showing one embodiment of the image display panel 24 according to the invention, which performs a monotone display. In the embodiment mentioned above, the display electrode 3 and the opposed electrode 4 are respectively arranged on outer surfaces of the integrated image display panel 35. However, as shown in FIGS. 4 and 5, it is possible to arrange the display electrode 3 and the opposed electrode 4 to inner portions of the image display panel 35. In this case, prior to integrate the image display panel 35, the display electrode 3 and the opposed electrode 4 may be arranged. Moreover, the partition walls 7 are arranged only to the opposed substrate 2. However, they are arranged to both of the transparent substrate 1 and the opposed substrate 2 and the image display panel 35 is integrated by connecting the partition walls with each other.

As to the Second and Third Embodiments of the Method of Manufacturing the Image Display Device Hereinafter, respective steps, which are features of the second and third embodiments of the method of manufacturing the image display device according to the invention, will be explained. It should be noted that the explanation is made to the liquid powders as one example in the explanation mentioned below, but it is possible to utilize the same filling steps for the liquid powders as it is with respect to the method of filling the particles if the liquid powders are exchanged to the particles.

The features on the second embodiment of the method of manufacturing the image display device according to the invention, in which the color display is performed by utilizing a predetermined color liquid powders and a black liquid powders, are to combine a liquid powder filling step, a liquid powder removing step, a substrate stacking step and an electrode adhering step, when manufacturing the image display device having the construction mentioned above. Moreover, the features on the third embodiment of the method of manufacturing the image display device according to the invention, in which the color display is performed through the color filter by utilizing white color liquid powders and black liquid powders, are to combine a liquid powder filling step, a liquid powder removing step, a substrate stacking step, a color filter stacking step (this step is not necessary when the transparent substrate utilized as the front panel has the color filter) and an electrode adhering step, when manufacturing the image display device having the construction mentioned above. Hereinafter, one embodiment of respective steps will be explained in detail. It should be noted that, in the embodiments mentioned below, the explanation is made to a monotone display of PDA (Personal Digital Assistant) as one example of the image display device wherein an electrode width corresponding to one pixel is 300 μm, an electrode interval is 50 μm, an interval between the transparent substrate 1 and the opposed substrate 2 is 50 μm and an opening rate is 75%. Moreover, details of respective construction members will be explained later. Further, among the steps of the first embodiment explained by using FIGS. 13-16, the same figures are used for the overlapped steps.

(1) As to the filling step of the liquid powders:

FIG. 13 is a schematic view explaining one embodiment of the filling step of the liquid powders. In the embodiment shown in FIG. 13, a predetermined amount of black liquid powders 5 and a predetermined amount of the liquid powders 6 having given color other than white in the second embodiment or a predetermined amount of white liquid powders 6 in the third embodiment wherein the color filter is used are orderly filled from a filling apparatus 11 in a space constituting the image display element formed by the partition walls 7 arranged on the opposed substrate 2. As the method of filling the liquid powders, use is made of a method for scattering the liquid powders 5, 6 to the opposed substrate 2 by utilizing gravity or air flow or a method for flying the liquid powders 5, 6 by utilizing an electrostatic charge. At that time, if necessary, the liquid powders 5, 6 are forcedly charged so as to be a mono-disperse state and are scattered for the purpose of evenly scattering by eliminating an agglutination of the liquid powders. Moreover, there is a case such that an electric field is applied to the opposed substrate 2 for the purpose of effectively scattering the liquid powders 5, 6 to the opposed substrate 2.

As a coloring method, as mentioned above, use is made of a method for utilizing the color liquid powders (the second embodiment), or, a method for utilizing the color filter (the third embodiment). In the case such that the color filter is used, it is possible to perform a color image display by filling the white and black liquid powders as mentioned above. On the other hand, in the case such that the color liquid powders are used, it is necessary to fill the liquid powders having various colors selectively into a space constituting the image display element (hereinafter, sometimes called as a cell). As a method of filling the liquid powders, use is made of a method wherein a mask is arranged at an upper portion of the cell and the liquid powders are selectively filled in a desired cell, or, a method wherein an electrostatic field showing the reverse charge with respect to a charge of the liquid powders to be scattered is applied to the cell, the liquid powders are selectively filled while an electrostatic filed showing the same charge with respect to the charge of the liquid powders to be scattered is applied to the other cells, so that the liquid powders are not selectively filled in the other cells.

In the present invention, when two or more kinds of different colors and different charge characteristics are filled in a predetermined position, a separately filling is preferably performed. However, according to a combination of the utilized two or more kinds of liquid powders or particles, it is possible to fill the liquid powders or the particles after preliminarily mixing them. However, even in this case, since color combinations of the liquid powders to be filled in a predetermined cell are different respectively, it is necessary to perform the filling step by at least three times. Therefore, in the case that the filling step for the black liquid powders is separately performed, there is not much merit as compared with a case such that it is necessary to perform the filling step by at least four times.

(2) As to the removing step of the unnecessary liquid powders;

FIGS. 14a and 14b are schematic views respectively explaining one embodiment of the removing step of the liquid powders. After the filling step of the liquid powders is finished, in the case such that the transparent substrate 1 and the opposed substrate 2 are stacked, as shown in FIG. 14b, it is necessary to remove the unnecessary liquid powders 5, 6 remaining on the partition wall 7 as shown in FIG. 14a. If the unnecessary liquid powders 5, 6 remain, a distance between the electrode 3 and the electrode 4 is made to be uneven when the substrates are stacked. Therefore, a driving voltage becomes different from a design value, and thus it is not possible to achieve desired display characteristics. As a method of removing the unnecessary liquid powders 5, 6 remaining on the partition wall 7, use is made of a method for removing them by utilizing an adhesive roll, a method for removing the unnecessary liquid powders by blowing them away by means of an air flow. As the another method, as shown in FIGS. 9b, 9c and 9d, it is possible to remove the unnecessary liquid powders 5, 6 on the partition wall 7 by sliding a plate member such as a blade on the substrate 1 with a friction, or, it is possible to remove the unnecessary liquid powders 5, 6 on the partition wall 7 by pressing a sheet-like member or a film-like member to the substrate 1. Moreover, if use is made of a step wherein the liquid powders 5, 6 are not adhered to the partition wall 7 selectively, it is not necessary to perform the removing step of the liquid powders 5, 6 on the partition wall 7.

(3) As to the substrate stacking step:

FIGS. 15a-15c are schematic views respectively explaining one embodiment of the substrate stacking step. In this embodiment, a positioning alignment is performed by utilizing the opposed substrate 2 and the transparent substrate 1 to which a mark for positioning is preliminarily arranged. In this case, for the purpose of improving durability and reliability as the display, an adhesive 32 is arranged on a tip portion of the partition wall 7 as shown in FIG. 15a, and a connection between the partition wall 7 and the transparent substrate 1 is performed through the adhesive 32. As a method of arranging the adhesive 32, use is made of a method for screen-printing a thermo-setting or UV hardening adhesive, a method for arranging an adhesive layer for sealing on an overall surface of the transparent substrate 1, or, a method for scattering the liquid powders having adhesion properties and sealing by heat and pressure.

Further, for the purpose of preventing an inclusion of component, which affects the display, such as external moisture content, a sealing agent is applied around an outermost peripheral portion of the substrate so as to seal a space between the substrates. As a method of applying the sealing agent, use is made of a method wherein a sealing agent 34 is applied to the outermost peripheral portion by means of a sealing agent applying device 33 as shown in FIG. 15b after the adhesive 12 is arranged on a tip portion of the partition wall 7 as mentioned above, and then as shown in FIG. 15c, the transparent substrate 1 and the opposed substrate 2 are positioned by utilizing an position aligning device not shown and are stacked.

Figure 18A:
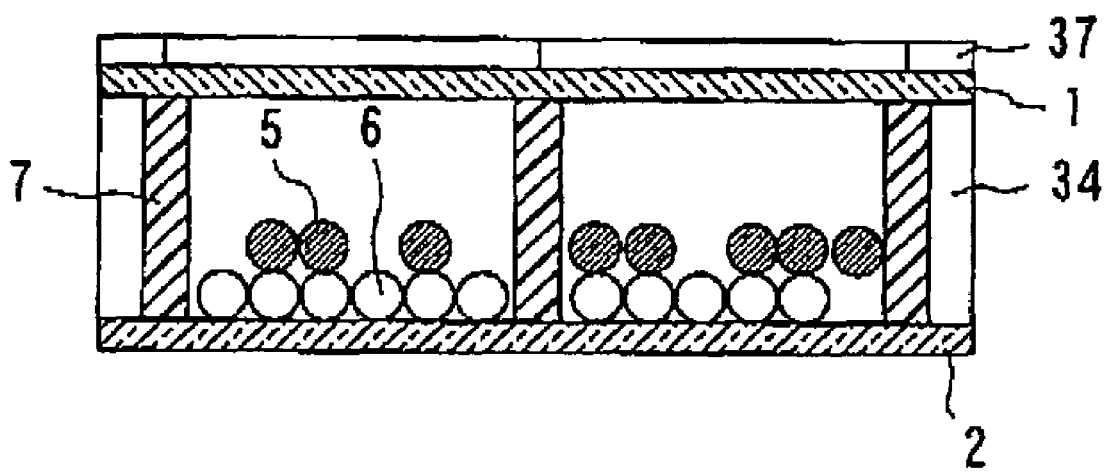
FIGS. 18a and 18b are schematic views respectively explaining one embodiment of a color filter stacking step in a method of manufacturing an image display device according to the invention.
Figure 18B:
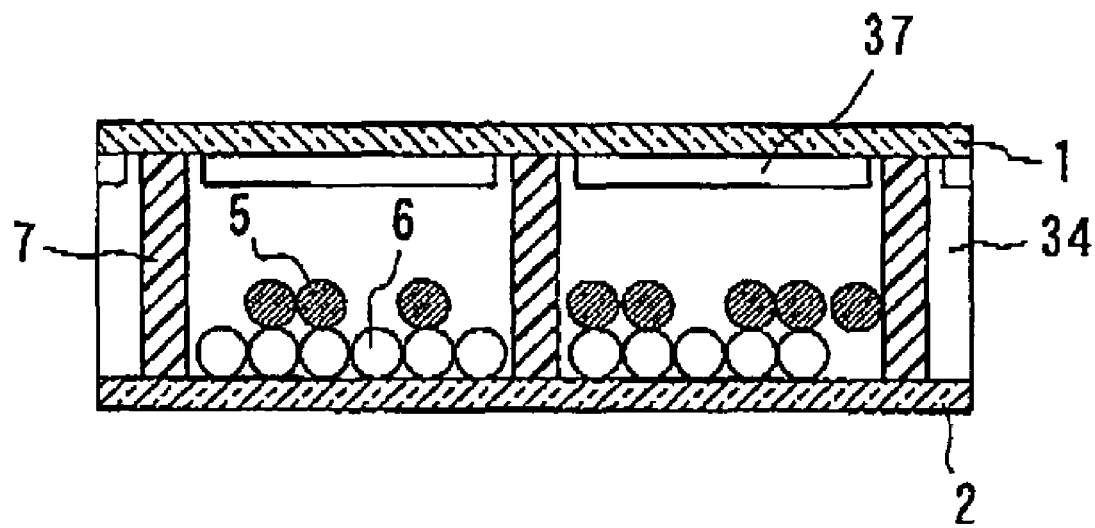

(4) As to the color filter stacking step:

FIGS. 18a and 18b are schematic views respectively explaining one embodiment of the color filter stacking step. In this embodiment, as shown in FIG. 18a, a color filter 37 having a plurality of color regions corresponding to respective cells e.g. having a plurality of combinations of R, G, B three fundamental colors is positioned and adhered to the transparent substrate 1 after the substrate stacking step. Moreover, as shown in FIG. 18b, in the case that the color filter 37 is preliminarily stacked to the transparent substrate 1, it is possible to obtain the image display panel according to the third embodiment having the color filter when the substrate stacking step explained in the above (3) is finished. It should be noted that the color filter stacking step is necessary in the third embodiment according to the invention but is not necessary in the second embodiment wherein the color image display is performed by utilizing no color filter.

(5) As to the electrode adhering step:

FIGS. 16a-16c are schematic views respectively explaining one embodiment of the electrode adhering step. In this embodiment, for the purpose of transmitting a signal for image display to an image display panel 35 so as to obtain an image display device wherein the image display panel 35 (display) is formed as a module, the electrodes 3, 4 of the image display plate 35 and a driving circuit 36 are connected. At first, as shown in FIG. 16a, a stripe electrode with the rib is formed on an outer surface of the transparent substrate I being a front plane as the display electrode 3. Then, as shown in FIG. 16b, a stripe electrode with the rib is formed on an outer surface of the opposed substrate 2 being a rear plane as the opposed electrode 4. After that, as shown in FIG. 16c, the electrodes 3, 4 of the image display panel 35 and the external driving circuit 36 formed by ACF (Anisotropic Conductive Film) are connected, and then the image display device formed as a module is obtained.

As a method of connecting the electrodes, use is made of a method for directly installing IC on the substrate by utilizing an adhesive, a method of installing a flexible printed board by utilizing an adhesive and so on. As the adhesive, use is made of an anisotropic conductive paste, and an adhesive in which the conductive particles are not scattered, except for an anisotropic conductive film made of an adhesive having an anisotropic property in which the conductive particles are scattered therein as mentioned above.

Figure 19:
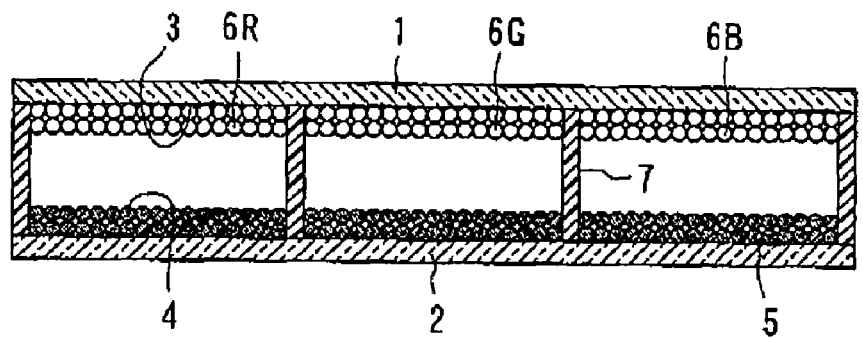
FIG. 19 is a schematic view showing one structure of a color image display panel according to a second embodiment in a method of manufacturing an image display device according to the invention.
Figure 20A:
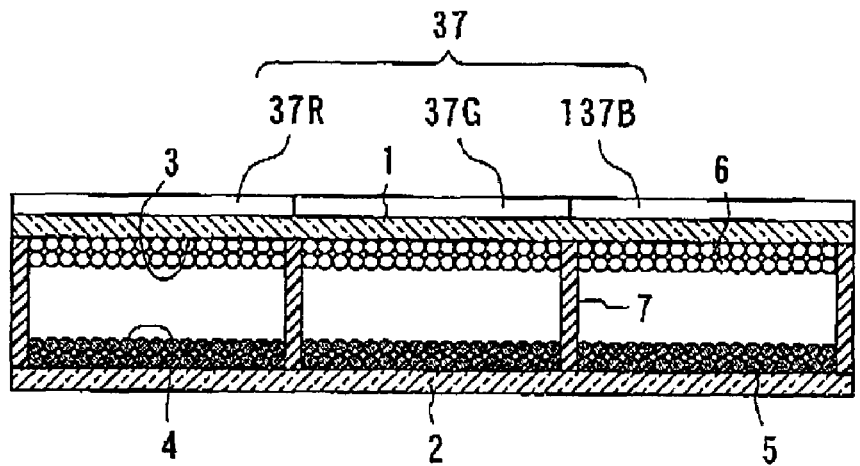
FIGS. 20a and 20b are schematic views respectively illustrating one structure of a color image display panel according to a third embodiment in a method of manufacturing an image display device according to the invention.
Figure 20B:
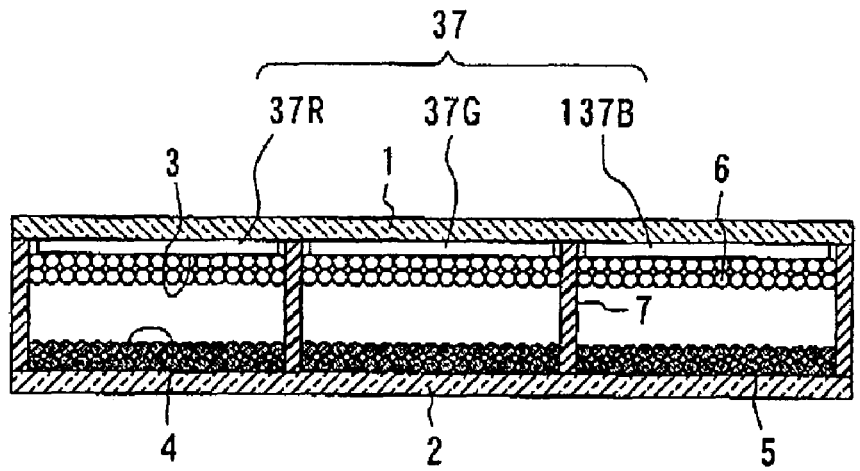

According to the steps mentioned above, the image display plate 35 is formed as a module, and the image display device is manufactured. FIG. 19 is a schematic view showing one embodiment of the color image display plate 35 manufactured according to the second embodiment of the invention. In the embodiment shown in FIG. 19, as the liquid powders, use is made of the black liquid powders 5, red liquid powders 6R, green liquid powders 6G and blue liquid powders 6B. FIGS. 20a and 20b are schematic views respectively showing one embodiment of the color image display plate 35 manufactured according to the third embodiment of the invention. In the embodiments shown in FIG. 20a and 29b, as the liquid powders, use is made of the black liquid powders 5 and: the white liquid powders 6, and the color filter 37 having red region 37R, green region 37G and blue region 37B is used. In FIG. 20a, the color filter 37 is arranged lately to the transparent substrate 1, and, in FIG. 20b, the color filter 37 is arranged preliminarily to the transparent substrate 1.

In the embodiment mentioned above, the display electrode 3 and the opposed electrode 4 are respectively arranged on outer surfaces of the integrated image display panel 35. However, as shown in FIGS. 4 and 5, it is possible to arrange the display electrode 3 and the opposed electrode 4 to inner portions of the image display panel 35. In this case, prior to integrate the image display panel 35, the display electrode 3 and the opposed electrode 4 may be arranged, Moreover, the partition walls 7 are arranged only to the opposed substrate 2. However, they are arranged to both of the transparent substrate 1 and the opposed substrate 2 and the image display panel 35 is integrated by connecting the partition walls with each other.

As to the Other Construction Members According to the Invention

Firstly, the substrate will be explained.

In the present invention, at least one of the substrates 1 and 2 is the transparent substrate through which a color of the liquid powders or the particles can be observed from outside of the device, and it is preferred to use a material having a high transmission factor of visible light and an excellent heat resistance. Whether a flexibility of the substrate is necessary or not is suitably selected in accordance with its use. For example, it is preferred to use a material having flexibility for the use of electronic paper and so on, and it is preferred to use a material having no flexibility for the use of a display of portable device such as mobile phone, PDA, laptop computer and so on.

Examples of the substrate material include polymer sheets such as polyethylene terephthalate, polyether sulfone, polyethylene, polycarbonate and inorganic sheets such as glass, quartz or so.

The thickness of the substrate is preferably 2 to 5000 µm, more preferably 5 to 1000 µm. When the thickness is too thin, it becomes difficult to maintain strength and distance uniformity between the substrates, and when the thickness is too thick, vividness and contrast as a display capability degrade, and in particular, flexibility in the case of using for an electronic paper deteriorates.

In the case of arranging no electrode on the substrate i.e. in the case that it is not necessary to form the image display device as a module, as the image display panel wherein the liquid powders or the particles are moved by means of an electric field produced by external electrodes, the particles or the liquid powders charged in a predetermined characteristic and having a color is pulled in or rebounds with respect to the substrate by means of an electric field generated by applying an electrostatic latent image on an outer surface of the substrate. Then, the particles or the liquid powders aligned in accordance with the electrostatic latent image is observed from outside of the display device through the transparent substrate. In this case, the electrostatic latent image mentioned above can be generated for example by a method wherein an electrostatic latent image generated in a known electro-photography system using an electro-photography photo-conductor is transferred and formed on the substrate of the image display device according to the invention, or, by a method wherein an electrostatic latent image is directly formed on the substrate by an ion flow.

In the case of arranging an electrode on the substrate, i.e. in the case that the image display device is formed as a module, the particles or the liquid powders charged in a predetermined characteristic and having a color is pulled in or rebounds with respect to the substrate by means of an electric field generated on respective electrodes formed on the substrate by applying an outer voltage thereto. Then, the particles or the liquid powders aligned in accordance with the electrode potential is observed from outside of the display device through the transparent substrate.

With respect to the electrode arranged to the transparent substrate, the electrode is formed of electro-conductive materials, which are transparent and having pattern formation capability. As such electro-conductive materials, indium oxide, metals such as aluminum, or conductive polymer such as polyaniline, polypyrrole and polythiophene formed by vacuum vapor deposition method, coating method, and so on. Additionally, the thickness of the electrode may be suitable unless the electro-conductivity is absent or any hindrance exists in optical transparency, and it is preferable to be 3 to 1000 nm, more preferable to be 5 to 400 nm. In this case, the applied outer voltage may be superimposed with a direct current or an alternate current.

A shape of the partition wall is suitably designed in accordance with a size of the particles or the liquid powders to be used for the display and is not restricted. However, it is preferred to set a width of the partition wall to 1-100 µm more preferably 1-50 µm and to set a height of the partition wall to 10-5000 µm more preferably 10-500 µm.

Moreover, as a method of forming the partition wall, use may be made of a double rib method wherein ribs are formed on the opposed substrates respectively and they are connected with each other and a single rib method wherein a rib is formed on one of the opposed substrates only. In the image display device according to the invention, both methods can be preferably applied.

Figure 12:
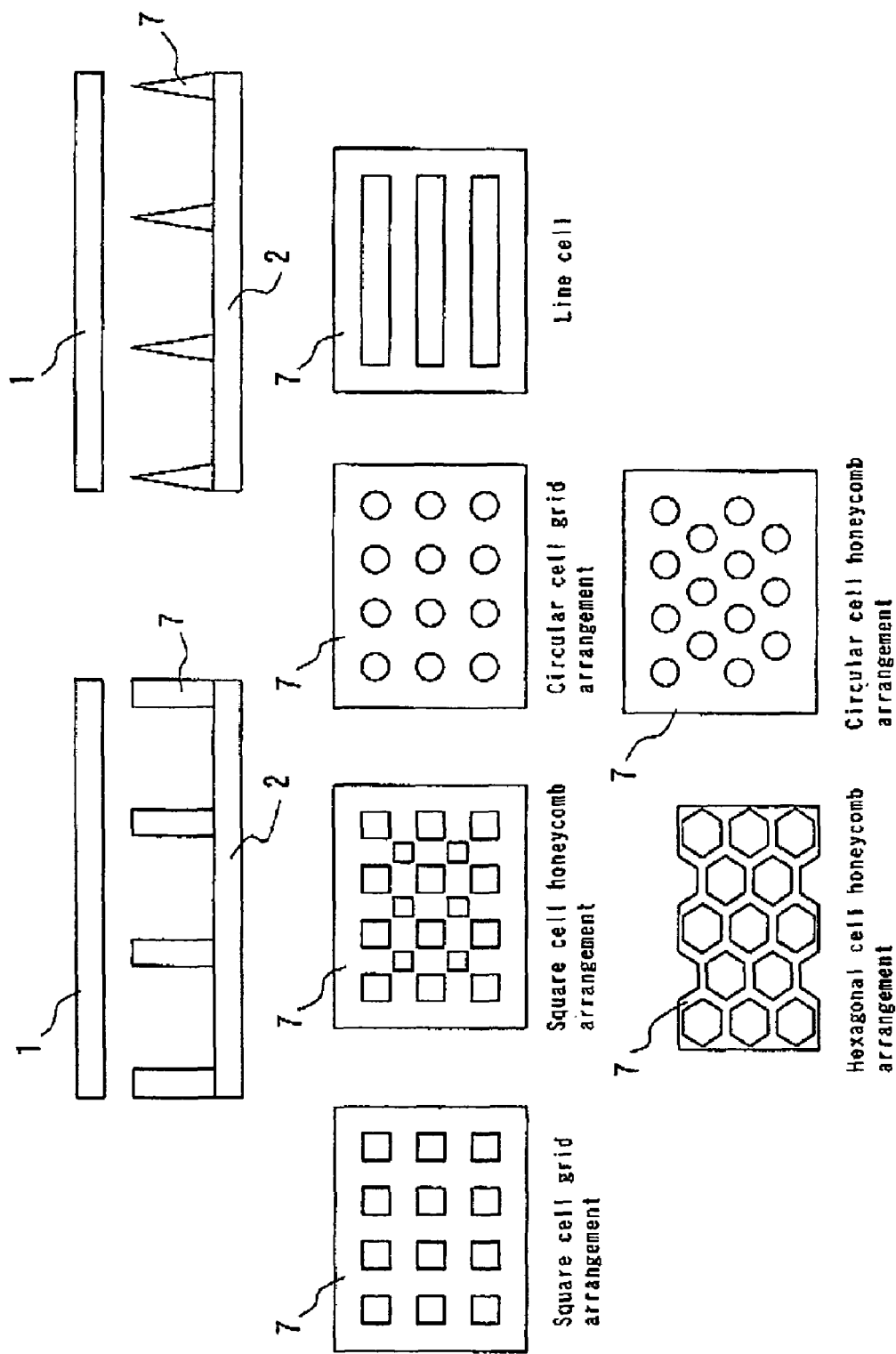
FIG. 12 is a schematic view depicting a shape of a display cell formed by partition walls.

The display cell formed by the partition walls each made of rib has a square shape, a triangular shape, a line shape, a circular shape and a hexagon shape, and has au arrangement such as a grid and a honeycomb, as shown in FIG. 12 viewed from a plane surface of the substrate. The formation method of the partition wall is not particularly restricted, however, a screen-printing method, a sandblast method, a photolithography method and an additive method. Among them, it is preferred to use a photolithography method using a resist film.

It is better to minimize a portion (area of frame portion of the display cell) corresponding to a cross section of the partition walls viewed from the display side.

Then, the liquid powders will be explained.

In the present invention, a term "liquid powder" means an intermediate material having both of liquid properties and particle properties and exhibiting a self-fluidity without utilizing gas force and liquid force. Preferably, it is a material having an excellent fluidity such that there is no repose angle defining a fluidity of powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powder.

That is, as is the same as the definition of the liquid crystal (intermediate phase between a liquid and a solid), the liquid powder according to the invention is a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in: a gas, and thus, in the image display device according to the invention, a solid material is used as a dispersant.

As the aerosol state, it is preferred that an apparent volume in a maximum floating state is two times or more than that in none floating state, more preferably 2.5 times or more than that in none floating state, and most preferably three times or more than that in none floating state. In this case, an upper limit is not defined, but it is preferred that an apparent volume is 12 times or smaller than that in none floating state.

If the apparent volume in the maximum floating state is smaller than two times, a display controlling becomes, difficult. On the other hand, if the apparent volume in the maximum floating state is larger than 12 times, a handling inconvenience during a liquid powder filling operation into the device such as a particle over-scattering occurs. That is, it is measured by filling the liquid powders in a transparent closed vessel through which the liquid powders are seen; vibrating or dropping the vessel itself to obtain a maximum floating state; and measuring an apparent volume at that time from outside of the vessel. Specifically, the liquid powder having a volume ⅓ of the vessel is filled as the liquid powder in a polypropylene vessel with a cap having a diameter (inner diameter) of 6 cm and a height of 10 cm (product name I-boy® produced by As-one Co., Ltd.), the vessel is set in the vibrator, and a vibration wherein a distance of 6 cm is repeated at a speed of 3 reciprocating/sec. is performed for 3 hours. Then, the apparent volume in the maximum floating state is obtained from an apparent volume just after a vibration stop.

Moreover, in the image display device according to the invention, it is preferred that a time change of the apparent volume of the liquid powders satisfies the following formula:

$$V_{10}/V_5 > 0.8;$$

here, $V_5$ indicates the apparent volume (cm$^3$) of the liquid powders after 5 minutes from the maximum floating state; and $V_{10}$ indicates the apparent volume (cm$^3$) of the liquid powders after 10 minutes from the maximum floating state. In this case, in the image display device according to the invention, it is preferred to set the time change $V_{10}/V_5$ of the apparent volume of the liquid powders to larger than 0.85, more preferably larger than 0.9, most preferably larger than 0.95. If the time change $V_{10}/V_5$ is not larger than 0.8, the liquid powders are substantially equal to normal particles, and thus it is not possible to maintain a high speed response and durability according to the invention.

Moreover, it is preferred that the average particle diameter d(0.5) of the particle materials constituting the liquid powders is 0.1-20 μm, more preferably 0.5-15 μm, most preferably 0.9-8 μm. If the average particle diameter d(0.5) is less than 0.1 μm, a display controlling becomes difficult. On the other hand, if the average particle diameter d(0.5) is larger than 20 μm, a display is possible, but opacifying power is decreased and thus a thin shape device is difficult. Here, the average particle diameter d(0.5) of the particle materials constituting the liquid powders is equal to d(0.5) in the following particle diameter distribution Span.

It is preferred that particle diameter distribution Span of the particle material constituting the liquid powders, which is defined by the following formula, is not more than 5 preferably not more than 3:

Particle diameter distribution: Span=(d(0.9)−d(0.1))/d(0.5); here, d(0.5) means a value of the particle diameter expressed by μm wherein an amount of the particle material constituting the liquid powders having the particle diameter larger than this value is 50% and an amount of the particle material constituting the liquid powders having the particle diameter expressed by μm wherein an amount of the particle material constituting the liquid powders having a particle diameter smaller than this value is 10%, and d(0.9) means a value of the particle diameter expressed by μm wherein an amount of the particle material constituting the liquid powders having the particle diameter smaller than this value is 90%. If the particle diameter distribution Span of the particle materials constituting the liquid powders is set to not more than 5, the, particle diameter becomes even and it is possible to perform an even liquid powder movement.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution. In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

The liquid powders may be formed by mixing necessary resin, charge control agent, coloring agent, additive and so on and grinding them, or, by polymerizing from monomer, or, by coating a particle with resin, charge control agent, coloring agent, and additive and so on. Hereinafter, typical examples of resin, charge control agent, coloring agent, additive and so on constituting the liquid powders will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, acryl urethane resin, acryl urethane silicone resin, acryl urethane fluorocarbon polymers, urethane resin, fluorocarbon polymers.

Examples of the electric charge control agent include, positive charge control agent include the fourth grade ammonium salt compound, nigrosine dye, triphenylmethane compound; imidazole derivatives, and so on, and negative charge control agent such as metal containing azo dye, salicylic acid metal complex, nitroimidazole derivative and so on.

As for a coloring agent, various kinds of basic or acidic dye may be employable. Examples include Nigrosine, Methylene Blue, quinoline yellow, rose bengal and do on.

Examples of the inorganic additives include titanium oxide, Chinese white, zinc sulfide, antimonial oxide, calcium carbonate, zinc white, talc, silica, calcium silicate, alumina white, cadmium yellow, cadmium red, cadmium orange, titanium yellow, iron blue, ultramarine blue, cobalt blue, cobalt green, cobalt violet, ferric oxide, carbon black, copper powder, aluminum powder and so on.

However, if the above materials are only mixed or coated with no contrivance, the liquid powders exhibiting an aerosol state cannot be obtained. The regular method of forming the liquid powders exhibiting an aerosol state is not defined, but the following method is preferably used.

At first, inorganic fine particles having an average particle size of 20-100 nm preferably 20-80 nm are preferably fixed on a surface of materials constituting the liquid powders. Moreover, it is preferred to treat the inorganic fine particles by a silicone oil. Here, as for the inorganic fine particles, use may be made of silicon dioxide (silica), zinc oxide, aluminum oxide, magnesium oxide, cerium oxide, ferric oxide, copper oxide and so on. In this case, a method of fixing the inorganic fine particles is important. For example, use may be made of hybridizer (NARA Machinery Co., Ltd.) or mechano-fusion (Hosokawa Micron Co., Ltd.), and the liquid powders showing an aerosol state are formed under a predetermined condition (for example processing time).

Here, in order to further improve a repeating durability, it is effective to control a stability of the resin constituting the liquid powders, especially, a water absorbing rate and a solvent insoluble rate. It is preferred that the water absorbing rate of the resin constituting the liquid powders sealed between the substrates is not more than 3 wt % especially not more than 2 wt %. In this case, a measurement of the water absorbing rate is performed according to ASTM-D570 and a measuring condition is 23° C. for 24 hours, As for the solvent insoluble rate of the resin constituting the liquid powders, it is preferred that a solvent insoluble rate of the liquid powders, which is defined by the following formula, is not less than 50% more preferably not less than 70%:

solvent insoluble rate (%)=$(B/A) \times 100$;

(here, A is a weight of the resin before being immersed into the solvent and B is a weight after the resin is immersed into good solvent at 25° C. for 24 hours).

If the solvent insoluble rate is less than 50%, a bleed is generated on a surface of the particle material constituting the liquid powders when maintaining for a long time. In this case, it affects an adhesion power with the liquid powders and prevents a movement of the liquid powders. Therefore, there is a case such that it affects a durability of the image display. Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

A surface charge density of a particle substance constituting the liquid powders can be measured as mentioned below. That is, according to a blow-off method, the liquid powders and carrier particles are sufficiently contacted and a saturated charge amount thereof is measured, so that a charge amount per a unit weight of the liquid powders can be measured. Then, a particle diameter and a specific gravity of the particle substance constituting the liquid powders are separately measured, and the surface charge density of the liquid powders is calculated by using them.

<Blow-Off Measuring Theory and Method>

In the blow-off method, a mixture of the liquid powders and the carriers are placed into a cylindrical container with nets at both ends, and high-pressure gas is blown from the one end to separate the liquid powders and the carriers, and then only the liquid powders are blown off from the mesh of the net. In this occasion, charge amount of reverse blown polarity remains on the carriers with the same charge amount of the liquid powders carried away out of the container. Then, all of electric flux by this electric charge are collected to Faraday cage, and are charged across a capacitor with this amount. Accordingly, the charge amount of the particles is determined as Q=CV (C: capacity, V: voltage across both ends of the capacitor) by measuring potential of both ends of the capacitor.

In the invention, as a blow-off powder charge amount measuring instrument, TB-200 produced by Toshiba Chemical Co., Ltd. was used, F963-2535 available from Powder TEC Co., Ltd. was employed as the same kind of carriers, and a specific gravity of the particle substance constituting the liquid powders was measured by a multi-volume density meter H1305 produced by Shimadzu Corporation. Then, the charge density per unit surface area (unit: $\mu C/m^2$) was calculated.

As for a filling amount of the liquid powders, it is preferred to control an occupied volume (volume occupied rate) of the liquid powders to 5-70 vol %, more preferably 10-65 vol %, most preferably 10-55 vol % of a space between the opposed substrates. If the volume occupied rate of the liquid powders is less than 5 vol %, a clear image display is not performed, and if it exceeds 70 vol %, the liquid powders become difficult to move. Here, a space volume means a volume capable of filling the liquid powders obtained by substituting an occupied portion of the partition wall 4 and a seal portion of the device from a space between the opposed substrates 1 and 2.

Further, in the present invention, it is important to control a gas in a gap surrounding the liquid powders between the substrates, and a suitable gas control contributes an improvement of display stability. Specifically, it is important to control a humidity of the gap gas to not more than 60% RH at 25° C., preferably not more than 50% RH, more preferably not more than 35% RH. The above gap means a gas portion surrounding the liquid powders obtained by substituting an occupied portion of the liquid powders 3, an occupied portion of the partition wall 4 and a seal portion of the device from the space between the opposed substrates 1 and 2 in FIG. 3.

A kind of the gap gas is not limited if it has the humidity mentioned above, but it is preferred to use dry air, dry nitrogen gas, dry helium gas, dry carbon dioxide gas, dry methane gas and so on. It is necessary to seal this gas in the device so as to maintain the humidity mentioned above. For example, it is important to perform the operations of filling the liquid powders and assembling the substrate under an atmosphere having a predetermined humidity and to apply a seal member and a seal method for preventing a humidity inclusion from outside of the device.

Then, the particles used in the invention will be explained.

The particles may be formed by mixing necessary resin, charge control agent, coloring agent, additive and so on and grinding them, or, by polymerizing from monomer, or, by coating a particle with resin, charge control agent, coloring agent, and additive and so on.

Hereinafter, typical examples of resin, charge control agent, coloring agent, additive and so on constituting the liquid powders will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, polyester resin, acryl urethane resin, acryl urethane silicone resin, acryl urethane fluorocarbon polymers, urethane resin, fluorocarbon polymers.

Examples of the electric charge control agent include, positive charge control agent include the fourth grade ammonium salt compound, nigrosine dye, triphenylmethane compound, imidazole derivatives, and so on, and negative charge control agent such as metal containing azo dye, salicylic acid metal complex, nitroimidazole derivative and so on.

As for a coloring agent, various kinds of basic or acidic dye may be employable. Examples include Nigrosine, Methylene Blue, quinoline yellow, rose bengal and do on.

Examples of the inorganic additives include titanium oxide, Chinese white, zinc sulfide, antimonial oxide, calcium carbonate, zinc white, talc, silica, calcium silicate, alumina white, cadmium yellow, cadmium red, cadmium orange, titanium yellow, iron blue, ultramarine blue, cobalt blue, cobalt green, cobalt violet, ferric oxide, carbon black, manganese ferrite black, cobalt ferrite black, copper powder, aluminum powder and so on.

Here, in order to further improve a repeating durability, it is effective to control a stability of the resin constituting the particles, especially, a water absorbing rate and a solvent insoluble rate. It is preferred that the water absorbing rate of the resin constituting the particles sealed between the substrates is not more than 3 wt % especially not more than 2 wt %. In this case, a measurement of the water absorbing rate is performed according to ASTM-D570 and a measuring condition is 23° C. for 24 hours.

As for the solvent insoluble rate of the resin constituting the particles, it is preferred that a solvent insoluble rate of the particles, which is defined by the following formula, is not less than 50% more preferably not less than 70%:

$$\text{solvent insoluble rate (\%)}=(B/A)\times 100;$$

(here, A is a weight of the resin before being immersed into the solvent and B is a weight after the resin is immersed into good solvent at 25° C. for 24 hours).

If the solvent insoluble rate is less than 50%, a bleed is generated on a surface of the particles when maintaining for a long time. In this case, it affects an adhesion power with the particles and prevents a movement of the particles. Therefore, there is a case such that it affects a durability of the image display.

Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

Moreover, the particles have a circular shape preferably.

In the present invention, as a particle diameter distribution of respective particles, it is preferred that particle diameter distribution Span of the particles, which is defined by the following formula, is not more than 5 preferably not more than 3:

$$\text{Span}=(d(0.9)-d(0.1))/d(0.5);$$

here, d(0.5) means a value of the particle diameter expressed by μm wherein an amount of the particles the particle diameter larger than this value is 50% and an amount of the particles having the particle diameter expressed by μm wherein an amount of the particles having a particle diameter smaller than this value is 10%, and d(0.9) means a value of the particle diameter expressed by μm wherein an amount of the particles having the particle diameter snaller than this value is 90%.

If the particle diameter distribution Span of the particles is set to not more than 5, the particle diameter becomes even and it is possible to perform an even particle movement.

Further, it is preferred to set an average particle diameter d(0.5) of respective particles in a range of 0.1-50 μm. If it exceeds this range, a clear display is not performed, and, if it is less than this range, a movement of the particles is prevented due to an excessively large agglutination power between the particles.

Furthermore, as to a relation between the particles, it is necessary to control a ratio of the d(0.5) of particles having the minimum diameter with respect to the d(0.5) of particles having the maximum diameter to not more than 50 preferably not more than 10.

Even in the case that the particle diameter distribution Span is made to be small, the particles having different charge characteristics are moved in the opposite direction with each other. Therefore, it is preferred that the particles can be easily moved by making the particle size even and by making an amount of the particles to an equal amount, so that the above range is obtained.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A surface charge density of the particles can be measured as mentioned below. That is, according to a blow-off method, the particles and carrier particles are sufficiently contacted and a saturated charge amount thereof is measured, so that a charge amount per a unit weight of the liquid powders can be measured. Then, a particle diameter and a specific gravity of the particles are separately measured, and the surface charge density of the particles is calculated by using them.

In the invention, as a blow-off powder charge amount measuring instrument, TB-200 produced by Toshiba Chemical Co., Ltd. was used, F963-2535 available from Powder TEC Co., Ltd. was employed as the same kind of carriers, and a specific gravity of the particles was measured by a multi-volume density meter H1305 produced by Shimadzu Corporation. Then, the charge density per unit surface area (unit: $\mu C/m^2$) was calculated.

As for a filling amount of the particles, it is preferred to control an occupied volume (volume occupied rate) of the particles to 5-70 vol %, more preferably 10-65 vol %, most preferably 10-55 vol % of a space between the opposed substrates. If the volume occupied rate of the particles is less than 5 vol %, a clear image display is not performed, and if it exceeds 70 vol %, the particles become difficult to move. Here, a space volume means a volume capable of filling the particles obtained by substituting an occupied portion of the partition wall 4 and a seal portion of the device from a space between the opposed substrates 1 and 2.

Further, in the present invention, it is important to control a gas in a gap surrounding the particles between the substrates, and a suitable gas control contributes an improvement of display stability. Specifically, it is important to control a humidity of the gap gas to not more than 60% RH at 25° C., preferably not more than 50% RH, more preferably not more than 35% RH. The above gap means a gas portion surrounding the particles obtained by substituting an occupied portion of the particles 3, an occupied portion of the partition wall 4 and a seal portion of the device from the space between the opposed substrates 1 and 2 in FIG. 3.

A kind of the gap gas is not limited if it has the humidity mentioned above, but it is preferred to use dry air, dry nitrogen gas, dry helium gas, dry carbon dioxide gas, dry methane gas and so on.

It is necessary to seal this gas in the device so as to maintain the humidity mentioned above. For example, it is important to perform the operations of filling the particles and assembling the substrate under an atmosphere having a predetermined humidity and to apply a seal member and a seal method for preventing a humidity inclusion from outside of the device.

The image display device according to the invention is applicable to the image display unit for mobile equipment such as notebook personal computers, PDAs, cellular phones and so on; to the electric paper for electric book, electric newspaper and so on; to the bulletin boards such as signboards, posters, blackboards and so on; to the image display unit for electric calculator, home electric application products, auto supplies and so on; to the card display unit for point card, IC card and so on; and to the display unit for electric POP, electric advertisement, electric price tag, electric musical score, RF-ID device and so on.

Then, the method of manufacturing the image display panel according to the invention will be explained in detail with reference to examples according to the invention and comparative examples. However, the present invention is not limited to the examples mentioned below.

At first, the examples and the comparative examples of the liquid powders in the method of manufacturing the image display panel according to the invention will be explained.

EXAMPLE 1

Liquid Powders

The image display panel was manufactured as follows.

At first, a substrate (7cm×7cm) with an electrode was prepared, and on the substrate, a rib having a height of 400 μm was produced to form a partition wall having a stripe shape.

The production of the rib was performed as follows. As an inorganic powder, a glass powder was prepared by melting, cooling and grinding a mixture of $SiO_2$, $Al_2O_3$, $Bi_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height of the partition wall) was controlled to be 400 μm. Then, a dry photo-resist was adhered. With respect to the adhered dry photo-resist, an exposing step and an etching step were performed so as to form a mask by which a partition wall pattern having a line of 50 μm, a space of 400 μm and a pitch of 250 μm can be formed. Then, unnecessary portions were removed by a sandblast to form a predetermined partition wall having a stripe shape. In this manner, a cell between the partition walls was formed on the substrate.

Then, two kinds of the liquid powders (liquid powders X, liquid powders Y) were prepared.

The liquid powders X were produced as follows. At first, methyl methacrylate monomer, $TiO_2$ (20 phr), charge control agent bontron E89 (Orient Chemical Industries, Ltd. 5 phr), initiator AIBN (0.5 phr) were suspended and polymerized. After that, particle diameters of the polymerized particles were graded by using a grading device. Then, by using hybridizer (Nara Machinery Co., Ltd.), the polymerized particles, external additive A (silica H2000, Wacker Ltd.) and external additive B (silica SS20, Japan Silica Ltd.) were set therein and treated at 4800 rpm for 5 minuets, so that the external additives were fixed on a surface of the polymerized particles to obtain the liquid powders.

The liquid powders Y were produced as follows. At first, styrene monomer, azo compounds (5 phr), charge control agent bontron N07 (Orient Chemical Industries, Ltd.: 5 phr), initiator AIBN (0.5 phr) were suspended and polymerized. After that, particle sizes of the polymerized particles were graded by using a grading device. Then, by using hybridizer (Nara Machinery Co., Ltd.), the polymerized particles, external additive C (silica H2050, Wacker Ltd.) and external additive B (silica SS20, Japan Silica Ltd.) were set therein and treated at 4800 rpm for 5 minuets, so that the external additives were fixed on a surface of the polymerized particles to obtain the liquid powders.

An average particle diameter of the particles constituting the liquid powders X was 3.3 μm and a surface charge density thereof was +23 $\mu C/m^2$. An average particle diameter of the particles constituting the liquid powders Y was 3.1 μm and a surface charge density thereof was −26 $\mu C/m^2$.

Then, according to the method of manufacturing the image display panel according to the invention shown in FIG. 10, the liquid powders X utilized as the first liquid powders 5 were dispersed in a gas from the nozzle 12 provided at the upper portion in the container 11 and were scattered in the cell 9 on the substrate 1 provided at the lower portion in the container 11, so that the liquid powders X were filled in the cell 9. Then, the liquid powders Y utilized as the second liquid powders 6 were dispersed in a gas from the nozzle 12 provided at the upper portion in the container 11 and were scattered in the cell 9, in which the liquid powders X were preliminarily filled, on the substrate 1 provided at the lower portion in the container 11, so that the liquid powders Y were filled in the cell 9, in which the liquid powders X were preliminarily filled. In this case, the liquid powders X and the liquid powders Y were mixed at the same weight with each other, and a filling rate (volume occupying rate) of the overall liquid powders between the glass substrates was controlled to be 25 vol %.

Figure 21:
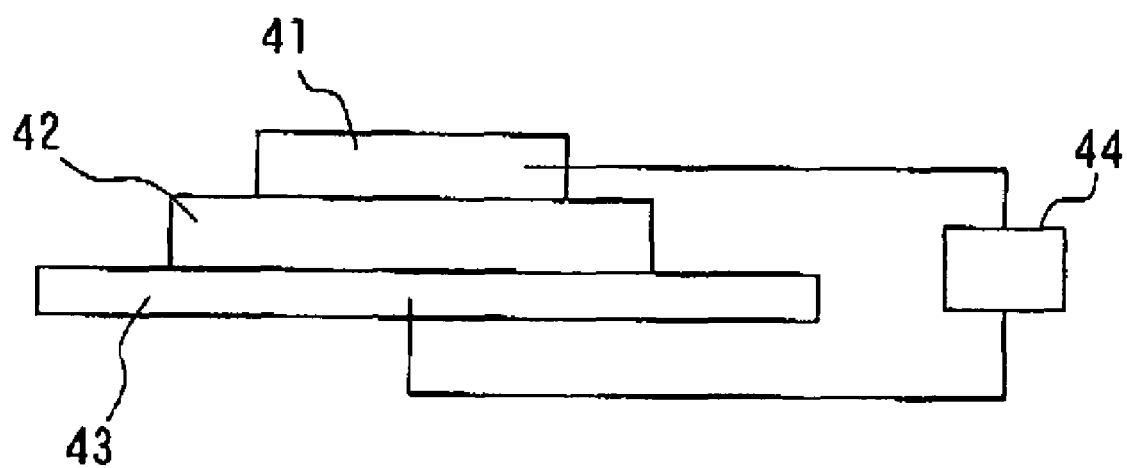
FIG. 21 is a schematic view explaining a method of measuring a volume specific resistance.

Then, as shown in FIG. 8, the liquid powders X and Y remaining on the top of the partition wall 7 were removed by rolling the removing roller 21 made of urethane rubber having a diameter of 30 mm (outer peripheral length: 9.4 cm), which was grounded, on the substrate 1. The removing roller 21 made of urethane rubber had JIS-A hardness of 70°. Moreover, a volume specific resistance of urethane rubber used in the removing roller 21, which was measured according to the method shown in FIG. 21, was $6.5 \times 10^8$ Ω·cm. In FIG. 21, numeral 41 was a conductive metal plate (upper plate), numeral 42 was a sample to be measured (here, urethane rubber), numeral 43 was a conductive metal plate (bottom plate), and numeral 44 was a voltage applying/resistance measuring device.

Then, a glass substrate, to which indium oxide electrode having a thickness of about 500 Å was arranged, was stacked to the substrate wherein the liquid powders X and the liquid powders Y were filled in the cell. In this case, the peripheral portion of the substrates was connected by using an epoxy adhesive, so that the display device was manufactured. Moreover, as the gas filled in the space between the substrates, use was made of an air having a relative humidity of 35% RH.

EXAMPLE 2

Liquid Powders

The image display panel was manufactured in the same manner as that of example 1 except that the rib formation method was different as mentioned below.

The production of the rib was performed as follows. At first, a substrate (7 cm×7 cm□) with an electrode was prepared, and on the substrate, a rib having a height of 50 μm was produced to form a partition wall having a stripe shape. In this case, a photo-sensitive film i.e. a dry film photo-resist NIT 250 (Nichigo-Morton Co., Ltd.) was laminated on a glass with ITO, and the laminated member was subjected to exposure and development, so that the partition wall having desired line. 30 μm, space: 320 μm and pitch: 350 μm was formed.

COMPARATIVE EXAMPLE 1

Liquid Powders

The same amounts of the liquid powders X and the liquid powders Y were filled alternately in order in the cell in such a manner that a total volume occupying rate became 25 vol %. After that, as shown in FIG. 8, the liquid powders X and Y remaining on the top of the partition wall 7 were tried to remove by rolling the removing roller 21 made of urethane rubber including no conductive agents and having a diameter of 30 mm (outer peripheral length: 9.4 mm), which was grounded, on the substrate 1. However, not only the liquid powders remaining on the top of the partition wall but also the liquid powders filled in the cell 9 were removed, and the display panel could not be manufactured.

COMPARATIVE EXAMPLE 2

Liquid Powders

The same amounts of the liquid powders X and the liquid powders Y were filled alternately in order in the cell in such a manner that a total volume occupying rate became 25 vol %. After that, as shown in FIG. 8, the liquid powders X and Y remaining on the top of the partition wall 7 were tried to remove by rolling the removing roller 21 made of urethane rubber in such a manner that JIS-A hardness became about 30° and having a diameter of 30 mm (outer peripheral length: 9.4 mm), which was grounded, on the substrate 1. However, not only the liquid powders remaining on the top of the partition wall but also the liquid powders filled in the cell 9 were removed, and the display panel could not be manufactured. The removing roller 21 made of urethane rubber had JIS-A hardness of 32°. Moreover, a volume specific resistance of urethane rubber used in the removing roller 21, which was measured according to the method shown in FIG. 21, was $6.3 \times 10^8$ Ω·cm.

COMPARATIVE EXAMPLE 3

Liquid Powders

The same amounts of the liquid powders X and the liquid powders Y were filled alternately in order in the cell in such a manner that a total volume occupying rate became 25 vol %. After that, as shown in FIG. 8, the liquid powders X and Y remaining on the top of the partition wall 7 were tried to remove by rolling the removing roller 21 made of urethane rubber in such a manner that JIS-A hardness became about 100° and having a diameter of 30 mm (outer peripheral length: 9.4 mm), which was grounded, on the substrate 1. However, the liquid powders remaining on the top of the partition wall could not be removed, and the display panel could not be manufactured. The removing roller 21 made of urethane rubber had JIS-A hardness of 98°. Moreover, a volume specific resistance of urethane rubber used in the removing roller 21, which was measured according to the method shown in FIG. 21, was $5.7 \times 10^8$ Ω·cm.

COMPARATIVE EXAMPLE 4

Liquid Powders

By using the same removing roller 21 as that of example 1, as shown in FIG. 9, the roller 21, which was not grounded, was rolled on the substrate 1, and the liquid powders X and Y remaining on the top of the partition wall 7 were tried to remove. However, the liquid powders X and Y filled in the cell 9 were also removed, and the display panel was not manufactured.

With respect to the image display devices installing the image display panels manufactured according to the examples 1-2 and the comparative examples 1-4, the following evaluations were performed. The results of the evaluations were shown in the following Table 1.

"JIS-A hardness of the removing roller"

It was obtained in such a manner that a type A durometer (KOBUNSHI KEIKI CO., LTD.) was installed in a constant force apparatus of 1 kgf and a value was measured after 20 minutes from a pressure plane contact.

"Volume specific resistance of the removing roller"

As shown in FIG. 21, the sheet 42 for the roller material having a thickness of 1 cm was arranged between the metal plates 41 and 43, and the volume specific resistance (Ω·cm) was measured from an electric resistance value when applying a voltage of 500 V.

TABLE 1

| Solid state properties of liquid powder removing roller | Example 1 | Example 2 | Comparative Example 1 | Comparative Example 2 | Comparative Example 3 | Comparative Example 4 |
|---|---|---|---|---|---|---|
| JIS-A hardness (°) | 70 | 70 | 68 | 32 | 98 | 70 |
| Volume specific resistance (Ω·cm) | $6.5 \times 10^8$ | $6.5 \times 10^{13}$ | $8.3 \times 10^{13}$ | $6.3 \times 10^8$ | $5.7 \times 10^8$ | $6.5 \times 10^8$ |
| Earth | grounded | grounded | grounded | grounded | grounded | not grounded |
| Unnecessary liquid powder removing state on partition wall | ○ | ○ | X | X | X | X | as to unnecessary liquid power removing state on partition wall
○: it is possible to favorably remove unnecessary liquid powers
X: it is not possible to favorably remove unnecessary liquid powers Then, the examples and the comparative examples of the particles in the method of manufacturing the image display panel according to the invention will be explained.

EXAMPLE 3

Particles

The image display panel was manufactured as follows.

At first, a substrate (7 cm×7 cm) with an electrode was prepared, and on the substrate, a rib having a height of 400 µm was produced to form a partition wall having a stripe shape.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height of the partition wall) was controlled to be 400 µm. Then, a dry photo-resist was adhered. With respect to the adhered dry photo-resist, an exposing step and an etching step were performed so as to form a mask by which a partition wall pattern having a line of 50 µm, a space of 400 µm and a pitch of 250 µm can be formed. Then, unnecessary portions were removed by a sand-blast to form a predetermined partition wall having a stripe shape. In this manner, a cell between the partition walls was formed on the substrate.

Then, two kinds of the particles (particles A, particles B) were prepared.

The particles A (black color particles) were produced in such a manner that acrylic urethane resin: EAU53B (Asia Industry Co., Ltd.)/IPDI cross-linking agent: Excel-Hardener HX (Asia Industry Co., Ltd.), CB (Carbon Black) 4 phr, charge control agent: BontronN07 (Orient Chemical Industries Ltd.) 2 phr were added, mixed, ground and classified by a jet-mill.

The particles B (white color particles) were produced in such a manner that acrylic urethane resin: EAU53B (Asia Industry Co., Ltd.)/IPDI cross-linking agent: Excel-Hardener HX (Asia Industry Co., Ltd.), titanium oxide 10 phr, charge control agent: BontronE89 (Asia Industry Co., Ltd.) 2 phr were added, mixed, ground and classified by the jet-mill.

An average particle diameter of the particles A was 9.2 µm and an average particle diameter of the particles B was 7.1 µm. A surface charge density of the particles A was +25 µC/m². Moreover, a surface charge density of the particles B was −25 µC/m².

Then, according to the method of manufacturing the image display panel according to the invention shown in FIG. 10, the particles A utilized as the first particles 5 were dispersed in a gas from the nozzle 12 provided at the upper portion in the container 11 and were scattered in the cell 9 on the substrate 1 provided at the lower portion in the container 11, so that the particles A were filled in the cell 9. Then, the particles B utilized as the second powders 6 were dispersed in a gas from the nozzle 12 provided at the upper portion in the container 11 and were scattered in the cell 9, in which the particles A were preliminarily filled, on the substrate 1 provided at the lower portion in the container 11, so that the particles B were filled in the cell 9, in which the particles A were preliminarily filled. In this case, the particles A and the particles B were mixed at the same weight with each other, and a filling rate (volume occupying rate) of the overall particles between the glass substrates was controlled to be 25 vol %.

Then, as shown in FIG. 8, the particles A and B remaining on the top of the partition wall 7 were removed by rolling the removing roller 21 made of urethane rubber having a diameter of 30 mm (outer peripheral length: 9.4 cm), which was grounded, on the substrate 1. The removing roller 21 made of urethane rubber had JIS-A hardness of 70°. Moreover, a volume specific resistance of urethane rubber used in the removing roller 21, which was measured according to the method shown in FIG. 21, was 6.5×10⁸ Ω·cm. In FIG. 21, numeral 41 was a conductive metal plate (upper plate), numeral 42 was a sample to be measured (here, urethane rubber), numeral 43 was a conductive metal plate (bottom plate), and numeral 44 was a voltage applying/resistance measuring device.

Then, a glass substrate, to which indium oxide electrode having a thickness of about 500 Å was arranged, was stacked to the substrate wherein the particles A and the particles B were filled in the cell. In this case, the peripheral portion of the substrates was connected by using an epoxy adhesive, so that the display device was manufactured. Moreover, as the gas filled in the space between the substrates, use was made of an air having a relative humidity of 35% RH.

EXAMPLE 4

Particles

The image display panel was manufactured in the same manner as that of example 3 except that the rib formation method was different as mentioned below.

The production of the rib was performed as follows. At first, a substrate (7 cm×7 cm□) with an electrode was prepared, and on the substrate, a rib having a height of 50 µm was produced to form a partition wall having a stripe shape. In this case, a photo-sensitive film i.e. a dry film photo-resist NIT 250 (Nichigo-Morton Co., Ltd.) was laminated on a glass with ITO, and the laminated member was subjected to exposure and development, so that the partition wall having desired line: 30 µm, space: 320 µm and pitch: 350 µm was formed.

COMPARATIVE EXAMPLE 5

Particles

The same amounts of the particles A and the particles B were filled alternately in order in the cell in such a manner that a total volume occupying rate became 25 vol %. After that, as shown in FIG. 8, the particles A and B remaining on the top of the partition wall 7 were tried to remove by rolling the removing roller 21 made of urethane rubber including no conductive agents and having a diameter of 30 mm (outer peripheral length: 9.4 mm), which was grounded, on the substrate 1. However, not only the particles remaining on the top of the partition wall but also the particles filled in the cell 9 were removed, and the display panel could not be manufactured. The removing roller 21 made of urethane rubber had JIS-A hardness of 68°. Moreover, a volume specific resistance of urethane rubber used in the removing roller 21, which was measured according to the method shown in FIG. 21, was $8.3 \times 10^{13}$ Ω·cm.

COMPARATIVE EXAMPLE 6

Particles

The same amounts of the particles A and the particles B were filled alternately in order in the cell in such a manner that a total volume occupying rate became 25 vol %. After that, as shown in FIG. 8, the particles A and B remaining on the top of the partition wall 7 were tried to remove by rolling the removing roller 21 made of urethane rubber in such a manner that JIS-A hardness became about 30° and having a diameter of 30 mm (outer peripheral length. 9.4 mm), which was grounded, on the substrate 1. However, not only the particles remaining on the top of the partition wall but also the particles filled in the cell 9 were removed, and the display panel could not be manufactured. The removing roller 21 made of urethane rubber had JIS-A hardness of 32°. Moreover, a volume specific resistance of urethane rubber used in the removing roller 21, which was measured according to the method shown in FIG. 21, was $6.3 \times 10^{8}$ Ω·cm.

COMPARATIVE EXAMPLE 7

Particles

The same amounts of the particles A and the particles B were filled alternately in order in the cell in such a manner that a total volume occupying rate became 25 vol %. After that, as shown in FIG. 8, the particles A and B remaining on the top of the partition wall 7 were tried to remove by rolling the removing roller 21 made of urethane rubber in such a manner that JIS-A hardness became about 100° and having a diameter of 30 mm (outer peripheral length: 9.4 mm), which was grounded, on the substrate 1. However, the particles remaining on the top of the partition wall could not be removed, and the display panel could not be manufactured. The removing roller 21 made of urethane rubber had JIS-A hardness of 98°. Moreover, a volume specific resistance of urethane rubber used in the removing roller 21, which was measured according to the method shown in FIG. 21, was $5.7 \times 10^{8}$ Ω·cm.

COMPARATIVE EXAMPLE 8

Particles

By using the same removing roller 21 as that of example 1, as shown in FIG. 9, the roller 21, which was not grounded, was rolled on the substrate 1, and the particles A and B remaining on the top of the partition wall 7 were tried to remove. However, the particles A and B filled in the cell 9 were also removed, and the display panel was not manufactured.

With respect to the image display devices installing the image display panels manufactured according to the examples 3-4 and the comparative examples 5-8, the following evaluations were performed. The results of the evaluations were shown in the following Table 2.

"JIS-A hardness of the removing roller"

It was obtained in such a manner that a type A durometer (KOBUNSHI KEIKI CO., LTD.) was installed in a constant force apparatus of 1 kgf and a value was measured after 20 minutes from a pressure plane contact.

"Volume specific resistance of the removing roller"

As shown in FIG. 21, the sheet 42 for the roller material having a thickness of 1 cm was arranged between the metal plates 41 and 43, and the volume specific resistance (Ω·cm) was measured from an electric resistance value when applying a voltage of 500 V.

TABLE 2

| Solid state properties of particle removing roller | Example 3 | Example 4 | Comparative Example 5 | Comparative Example 6 | Comparative Example 7 | Comparative Example 8 |
|---|---|---|---|---|---|---|
| JIS-A hardness (°) | 70 | 70 | 68 | 32 | 98 | 70 |
| Volume specific resistance (Ω · cm) | $6.5 \times 10^8$ | $6.5 \times 10^8$ | $8.3 \times 10^{13}$ | $6.3 \times 10^8$ | $5.7 \times 10^8$ | $6.5 \times 10^8$ |
| Earth | grounded | grounded | grounded | grounded | grounded | not grounded |
| Unnecessary particle removing state on partition wall | ○ | ○ | X | X | X | X | as to unnecessary particle removing state on partition wall
○: it is possible to favorably remove unnecessary particles
X: it is not possible to favorably remove unnecessary particles

INDUSTRIALLY APPLICABILITY

In the method of manufacturing the image display panel and the image display device according to the invention, since the method comprises, in the case of filling and setting the liquid powders and the particles in a plurality of cells formed by the partition walls on the substrate, the steps of: setting a nozzle at an upper portion of a container; setting the substrate, on which the partition walls are arranged, at a lower portion of the container; scattering the liquid powders or the particles dispersed in a gas from the nozzle arranged at the upper portion in the container; and filling the liquid powders or the particles in the cells on the substrate arranged at the lower portion of the container, it is possible to seal the liquid powders or the particles equally and uniformly in a plurality of cells.

Moreover, in the method of manufacturing the image display device and the image display device according to the invention, since, in the case of manufacturing the image display device which can display a monotone image or a color image, the filling step, the removing step, the substrate stacking step and the electrode adhering step are combined, it is possible to form a module including a circuit used for displaying the image.

The invention claimed is:

1. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a pale bright color and a deep dark color and having different charge characteristics, or, two kinds of particles having a pale bright color and a deep dark color and having different charge characteristics, are sealed between a transparent substrate and an opposed substrate, and, in which the liquid powders or the particles, to which an electrostatic field produced by a pair of electrodes having different potentials is applied, are made to fly and move so as to display a monotone image, wherein the method comprises:

filling an amount of the liquid powders or the particles in spaces constituting the image display cells isolated by the partition walls;

removing unnecessary liquid powders or unnecessary particles remaining on the partition walls in the filling;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module, wherein an apparent volume in a maximum floating state of the liquid powders is two times or more than that in non-floating state.

2. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a color other than white color and a black color and having different charge characteristics, or, two kinds of particles having a color other than white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a color image, wherein the method comprises:

filling an amount of the liquid powders or the particles in spaces constituting the image display cells isolated by the partition walls;

removing unnecessary liquid powders or unnecessary particles remaining on the partition walls in the filling;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module; wherein an apparent volume in a maximum floating state of the liquid powders is two times or more than that in non-floating state.

3. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a white color and a black color and having different charge characteristics, or, two kinds of particles having a white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a color image via a color filter provided to the transparent substrate constituting a front panel, wherein the method comprises:

filling an amount of the liquid powders or the particles in spaces constituting the image display cells isolated by the partition walls;

removing unnecessary liquid powders or unnecessary particles remaining on the partition walls in the filling step;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module, wherein an apparent volume in a maximum floating state of the liquid powders is two times or more than that in non-floating state.

4. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a pale bright color and a deep dark color and having different charge characteristics, or, two kinds of particles having a pale bright color and a deep dark color and having different charge characteristics, are sealed between a transparent substrate and an opposed substrate, and, in which the liquid powders or the particles, to which an electrostatic field produced by a pair of electrodes having different potentials is applied, are made to fly and move so as to display a monotone image, wherein the method comprises:

filling an amount of the liquid powders or the particles in spaces constituting the image display cells isolated by the partition walls;

removing unnecessary liquid powders or unnecessary particles remaining on the partition walls in the filling;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module wherein a time change of an apparent volume of the liquid powders satisfies the following formula:

$$V_{10}/V_5 > 0.8;$$

wherein, $V_5$ indicates the apparent volume ($cm_3$) of the liquid powders after 5 minutes from the maximum floating state; and $V_{10}$ indicates the apparent volume ($cm_3$) of the liquid powders after 10 minutes from the maximum floating state.

5. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a pale bright color and a deep dark color and having different charge characteristics, or, two kinds of particles having a pale bright color and a deep dark color and having different charge characteristics, are sealed between a transparent substrate and an opposed substrate, and, in which the liquid powders or the particles, to which an electrostatic field produced by a pair of electrodes having different potentials is applied, are made to fly and move so as to display a monotone image, wherein the method comprises:

filling an amount of the liquid powders or the particles in spaces constituting the image display cells isolated by the partition walls;

removing unnecessary liquid powders or unnecessary particles remaining on the partition walls in the filling;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module wherein an average particle diameter d(0.5) of a particle component constituting the liquid powders is 0.1 - 20 μm.

6. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a pale bright color and a deep dark color and having different charge characteristics, or, two kinds of particles having a pale bright color and a deep dark color and having different charge characteristics, are sealed between a transparent substrate and an opposed substrate, and, in which the liquid powders or the particles, to which an electrostatic field produced by a pair of electrodes having different potentials is applied, are made to fly and move so as to display a monotone image, wherein the method comprises:

filling an amount of the liquid powders or the particles in spaces constituting the image display cells isolated by the partition walls;

removing unnecessary liquid powders or unnecessary particles remaining on the partition walls in the filling;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module wherein a difference between surface charge densities of the two kinds of particles measured by utilizing same carrier in accordance with a blow-off method is 5 μC/m$^2$ -150 μC/m$^2$ in an absolute value.

7. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a pale bright color and a deep dark color and having different charge characteristics, or, two kinds of particles having a pale bright color and a deep dark color and having different charge characteristics, are sealed between a transparent substrate and an opposed substrate, and, in which the liquid powders or the particles, to which an electrostatic field produced by a pair of electrodes having different potentials is applied, are made to fly and move so as to display a monotone image, wherein the method comprises:

filling an amount of the liquid powders or the particles in spaces constituting the image display cells isolated by the partition walls;

removing unnecessary liquid powders or unnecessary particles remaining on the partition walls in the filling;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module wherein the particles are particles in which the maximum surface potential, in the case that the surface of particles is charged by a generation of Corona discharge caused by applying a voltage of 8 KY to a Corona discharge device deployed at a distance of 1 mm from the surface, is 300 V or greater at 0.3 second after the discharge.

8. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a color other than white color and a black color and having different charge characteristics, or, two kinds of particles having a color other than white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a color image, wherein the method comprises:

filling an amount of the liquid powders or the particles in spaces constituting the image display cells isolated by the partition walls;

removing unnecessary liquid powders or unnecessary particles remaining on the partition walls in the filling;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module wherein a time change of an apparent volume of the liquid powders satisfies the following formula:

$$V_{10}/V_5 > 0.8;$$

wherein, $V_5$ indicates the apparent volume (cm$^3$) of the liquid powders after 5 minutes from the maximum floating state; and $V_{10}$ indicates the apparent volume (cm$^3$) of the liquid powders after 10 minutes from the maximum floating state.

9. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a color other than white color and a black color and having different charge characteristics, or, two kinds of particles having a color other than white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a color image, wherein the method comprises:

filling an amount of the liquid powders or the particles in spaces constituting the image display cells isolated by the partition walls;

removing unnecessary liquid powders or unnecessary particles remaining on the partition walls in the filling;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module wherein an average particle diameter d(0.5) of a particle component constituting the liquid powders is 0.1 - 20 μm.

10. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a color other than white color and a black color and having different charge characteristics, or, two kinds of particles having a color other than white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a color image, wherein the method comprises:

filling an amount of the liquid powders or the particles in spaces constituting the image display cells isolated by the partition walls;

removing unnecessary liquid powders or unnecessary particles remaining on the partition walls in the filling;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module wherein a difference between surface charge densities of the two kinds of particles measured by utilizing same carrier and in accordance with a blow-off method is 5 μC/m$^2$ -150 μC/m$^2$ in an absolute value.

11. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a color other than white color and a black color and having different charge characteristics, or, two kinds of particles having a color other than white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a color image, wherein the method comprises:

filling an amount of the liquid powders or the particles in spaces constituting the image display cells isolated by the partition walls;

removing unnecessary liquid powders or unnecessary particles remaining on the partition walls in the filling;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module wherein the particles are particles in which the maximum surface potential, in the case that the surface of particles is charged by a generation of Corona discharge caused by applying a voltage of 8 KY to a Corona discharge device deployed at a distance of 1 mm from the surface, is 300 V or greater at 0.3 second after the discharge.

12. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a white color and a black color and having different charge characteristics, or, two kinds of particles having a white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a color image via a color filler provided to the transparent substrate constituting a front panel, wherein the method comprises:

filling an amount of the liquid powders or the particles in spaces constituting the image display cells isolated by the partition walls;

removing unnecessary liquid powders or unnecessary particles remaining on the partition walls in the filling step;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module wherein a time change of an apparent volume of the liquid powders satisfies the following formula:

$$V_{10}/V_5 > 0.8;$$

wherein, $V_5$ indicates the apparent volume (cm$^3$) of the liquid powders after 5 minutes from the maximum floating state; and $V_{10}$ indicates the apparent volume (cm$^3$) of the liquid powders after 10 minutes from the maximum floating state.

13. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a white color and a black color and having different charge characteristics, or, two kinds of particles having a white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a color image via a color filter provided to the transparent substrate constituting a front panel, wherein the method comprises:

filling an amount of the liquid powders or the particles in spaces constituting the image display cells isolated by the partition walls;

removing unnecessary liquid powders or unnecessary particles remaining on the partition walls in the filling step;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module wherein an average particle diameter d(O.5) of a particle component constituting the liquid powders is 0.1 - 20 μn.

14. A method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a white color and a black color and having different charge characteristics, or, two kinds of particles having a white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a color image via a color filter provided to the transparent substrate constituting a front panel, wherein the method comprises:

filling an amount of the liquid powders or the particles in spaces constituting the image display cells isolated by the partition walls;

removing unnecessary liquid powders or unnecessary particles remaining on the partition walls in the filling step;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module wherein a difference between surface charge densities of the two kinds of particles measured by utilizing same carrier and in accordance with a blow-off method is 5 $\mu C/m^2$ -150 $\mu C/m^2$ in an absolute value.

15. method of manufacturing an image display device which comprises an image display panel having one or more image display cells isolated from each other by partition walls, in which two kinds of liquid powders composed of a solid material stably floating as a dispersoid in a gas and exhibiting a high fluidity in an aerosol state, having a white color and a black color and having different charge characteristics, or, two kinds of particles having a white color and a black color and having different charge characteristics, are sealed between a transparent substrate and an opposed substrate, and, in which the liquid powders or the particles, to which an electrostatic field produced by a pair of electrodes having different potentials is applied, are made to fly and move so as to display a color image via a color filter provided to the transparent substrate constituting a front panel, wherein the method comprises:

filling an amount of the liquid powders or the particles in spaces constituting the image display cells isolated by the partition walls;

removing unnecessary liquid powders or unnecessary particles remaining on the partition walls in the filling step;

stacking the transparent substrate and the opposed substrate via the partition walls and applying a sealing agent at a peripheral portion of the substrate so as to make an atmosphere between the transparent substrate and the opposed substrate uniform; and connecting a circuit for displaying the image to the electrode so as to form a module wherein the particles are particles in which the maximum surface potential, in the case that the surface of particles is charged by a generation of Corona discharge caused by applying a voltage of 8 KY to a Corona discharge device deployed at a distance of 1 mm from the surface, is 300 V or greater at 0.3 second after the discharge.

* * * * *